United States Patent
Bacon-Maldonado, III et al.

(10) Patent No.: US 11,332,321 B2
(45) Date of Patent: May 17, 2022

(54) VEHICLE-MOUNTED CONVEYOR SYSTEM

(71) Applicant: Multilift, Inc., Lakewood, CO (US)

(72) Inventors: Job Bacon-Maldonado, III, Littleton, CO (US); Robert D. Drost, Highlands Ranch, CO (US); Chris K. Miller, Denver, CO (US); Kenneth B. Drost, Denver, CO (US); Job Maldonado, Jr., Littleton, CO (US); Kenton C. Ensor, Littleton, CO (US)

(73) Assignee: Multilift, Inc., Lakewood, CO (US)

( * ) Notice: Subject to any disclaimer, the term of this patent is extended or adjusted under 35 U.S.C. 154(b) by 0 days.

(21) Appl. No.: 17/171,754

(22) Filed: Feb. 9, 2021

(65) Prior Publication Data

US 2021/0163230 A1     Jun. 3, 2021

Related U.S. Application Data

(63) Continuation-in-part of application No. 16/431,628, filed on Jun. 4, 2019, now Pat. No. 10,913,381.

(60) Provisional application No. 62/680,365, filed on Jun. 4, 2018.

(51) Int. Cl.
    *B65G 41/00*        (2006.01)
    *B65G 21/12*        (2006.01)
    *B65G 15/44*        (2006.01)

(52) U.S. Cl.
    CPC .......... *B65G 41/008* (2013.01); *B65G 21/12* (2013.01); *B65G 41/005* (2013.01); *B65G 15/44* (2013.01)

(58) Field of Classification Search
    CPC .... B65G 41/008; B65G 21/12; B65G 41/005; B65G 15/44

USPC ........................................................ 198/300
    See application file for complete search history.

(56) References Cited

U.S. PATENT DOCUMENTS

| | | | |
|---|---|---|---|
| 2,541,523 A | 2/1951 | Lang | |
| 2,809,743 A | 10/1957 | Hinchcliffe | |
| 2,930,478 A | 3/1960 | Ruffino | |
| 2,987,169 A | 6/1961 | Hinchcliffe | |

(Continued)

FOREIGN PATENT DOCUMENTS

| WO | WO-2010048695 A1 * | 5/2010 | ............. B65G 47/18 |
|---|---|---|---|

OTHER PUBLICATIONS

"Econo-Cleat®," Flexco, 2015, retrieved from: http://www.flexco.com/products/mobile_econo_cleat.html, 2pages.

(Continued)

*Primary Examiner* — Gene O Crawford
*Assistant Examiner* — Lester Rushin, III
(74) *Attorney, Agent, or Firm* — Sheridan Ross P.C.

(57) ABSTRACT

Embodiments of the present invention generally relate to a vehicle-mounted conveyor system, and more specifically a conveyor system that can be mounted on a short-length, non-CDL truck. The conveyor can convey a wide range of materials, including shingles, shakes (e.g., loose dirt, gravel, and rocks), tiles, underlayment, solar panels, siding, bricks, fasteners, etc. In some embodiments, the conveyor system includes a frame with a four-sided FRP tube, a belt positioned on top of the tube, cleats interconnected to the belt, belt pulleys, a motor, a material backstop, and conveyor positioning features. Conveyor positioning features include a tilting hinge a conveyor carriage, a telescopic vertical post, and a slewing drive. In some embodiments, the conveyor frame is a fiber-reinforced plastic material.

20 Claims, 25 Drawing Sheets

(56) References Cited

U.S. PATENT DOCUMENTS

| | | | |
|---|---|---|---|
| 3,085,676 | A | 4/1963 | Hinchcliffe |
| 3,100,566 | A | 8/1963 | Hinchcliffe |
| 3,334,895 | A | 8/1967 | Daniels et al. |
| 3,378,103 | A | 4/1968 | Zwight et al. |
| 3,542,299 | A | 11/1970 | Sholl |
| 3,822,526 | A | 7/1974 | Black |
| 3,910,405 | A | 10/1975 | Couperus et al. |
| 3,974,908 | A | 8/1976 | Keichinger |
| 4,143,759 | A | 3/1979 | Paradis |
| 4,534,461 | A | 8/1985 | Silverthorn et al. |
| 4,582,193 | A | 4/1986 | Larsson |
| 4,700,078 | A | 10/1987 | Mizuno et al. |
| 4,727,419 | A | 2/1988 | Yamada et al. |
| 4,832,183 | A | 5/1989 | Lapeyre |
| 5,092,946 | A | 3/1992 | Okuyama et al. |
| 5,194,107 | A | 3/1993 | Okuyama et al. |
| 5,205,395 | A | 4/1993 | Bruno et al. |
| 5,415,217 | A | 5/1995 | Okuyama et al. |
| 5,568,857 | A | 10/1996 | Chen et al. |
| 5,685,687 | A | 11/1997 | Frye |
| 5,697,294 | A | 12/1997 | Keller et al. |
| 5,816,142 | A | 10/1998 | Keller et al. |
| 5,984,077 | A | 11/1999 | Frye et al. |
| 6,053,305 | A | 4/2000 | Helmerson |
| 6,142,290 | A | 11/2000 | Tagliaferri |
| 6,292,997 | B1 | 9/2001 | Ollendick et al. |
| 6,488,145 | B1 | 12/2002 | Diego et al. |
| 6,527,499 | B2 | 3/2003 | Leimbach et al. |
| 6,871,868 | B2 | 3/2005 | Pogue |
| 6,926,134 | B2 | 8/2005 | Verdigets et al. |
| 7,249,496 | B2 | 7/2007 | Kunitake et al. |
| 7,347,317 | B2 | 3/2008 | Aizawa et al. |
| 7,487,814 | B2 | 2/2009 | Mizota |
| 7,543,698 | B2 | 6/2009 | Haskell |
| 8,401,146 | B2 | 3/2013 | Vorhees |
| 8,876,455 | B2 | 11/2014 | Pogue |
| 9,061,830 | B2 | 6/2015 | Miller et al. |
| 9,260,247 | B2 | 2/2016 | Miller et al. |
| 9,745,133 | B2 | 8/2017 | Miller et al. |
| 9,783,093 | B1 | 10/2017 | Esch |
| 9,856,087 | B2 | 1/2018 | Beesley |
| 10,065,801 | B2 | 9/2018 | Miller et al. |
| 10,150,660 | B2 | 12/2018 | Koppelaar et al. |
| 10,464,754 | B2 | 11/2019 | Miller et al. |
| 10,766,710 | B2 | 9/2020 | Bacon-Maldonado, III et al. |
| 10,906,744 | B2 * | 2/2021 | Grose ................. B65G 41/008 |
| 10,913,381 | B2 | 2/2021 | Bacon-Maldonado, III et al. |
| 2005/0040015 | A1 | 2/2005 | Schlegel et al. |
| 2005/0279616 | A1 | 12/2005 | Pogue |
| 2006/0182575 | A1 | 8/2006 | Pogue |
| 2007/0084275 | A1 | 4/2007 | Gotou et al. |
| 2007/0135960 | A1 | 6/2007 | Shibao et al. |
| 2007/0289847 | A1 | 12/2007 | Nakamura |
| 2008/0053796 | A1 | 3/2008 | DePaso et al. |
| 2008/0173521 | A1 | 7/2008 | Hitch |
| 2008/0298940 | A1 | 12/2008 | Cleasby et al. |
| 2009/0010747 | A1 | 1/2009 | Pogue |
| 2009/0148260 | A1 | 6/2009 | Leimbach et al. |
| 2009/0294246 | A1 | 12/2009 | Pogue |
| 2010/0043952 | A1 | 2/2010 | Terazono |
| 2010/0108470 | A1 * | 5/2010 | Grose ................. B65G 47/18 198/671 |
| 2011/0013177 | A1 | 1/2011 | Crim |
| 2012/0092149 | A1 | 4/2012 | Fujisawa |
| 2012/0325903 | A1 | 12/2012 | Takahashi |
| 2014/0182070 | A1 | 7/2014 | Clark |
| 2016/0031650 | A1 | 2/2016 | Petersen et al. |
| 2018/0072517 | A1 | 3/2018 | Girtman et al. |
| 2020/0140198 | A1 | 5/2020 | Bacon-Maldonado, III et al. |
| 2021/0053766 | A1 | 2/2021 | Bacon-Maldonado, III et al. |

OTHER PUBLICATIONS

"E-Z T050: E-Zmite Troughing Model," E-Zlift Conveyors, Archived Webpage dated Nov. 30, 2020, retrieved from https://web.archive.org/web/20201130190249/https://ezliftconveyors.com/wp-content/uploads/E-Z-T050-brochure.pdf, 1 page.

"Increase Productivity, Improve Versatility, Create Solutions," The Lowdown Conveying Important Information, 2005, vol. 4(1), retrieved from: http://www.flexco.com/filebase/en/src/Belt_Conveyor_Insights/IncreaseProductivityImprov.pdf, 2 pages.

"EXT-52 Conveyor," Cleasby Manufacturing, Date Unknown, retrieved from: http://www.cleasbyconveyors.com/ext-52-conveyor/ on Feb. 15, 2018, 6 pages.

"FBR Conveyor," Cleasby Manufacturing, Date Unknown, retrieved from: http://www.cleasbyconveyors.com/products/truck-mounted-conveyors/fbr-conveyor/ on Feb. 15, 2018, 3 pages.

"New On-Road & Off-Road Slinger Trucks and Equipment at CAS Slingers," CAS Slingers, Date Unknown, retrieved from: https://slingers.com/new-equipment/models/ on Feb. 15, 2018, 3 pages.

"Stone Slinger High-Speed Conveyor Trucks," Stone Slinger, 2017, retrieved from: http://stoneslinger.com/ on Feb. 15, 2018, 1 page.

* cited by examiner

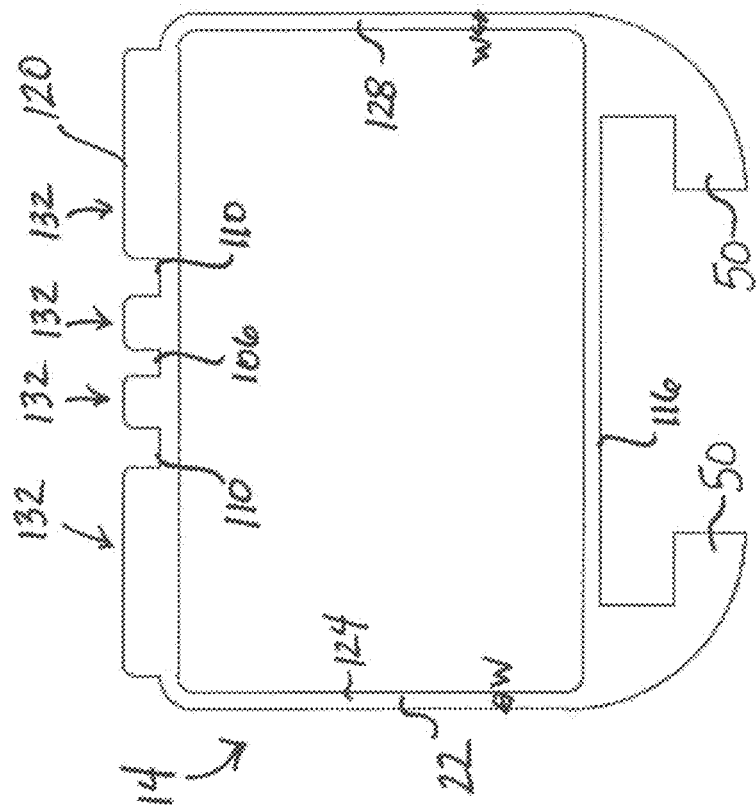
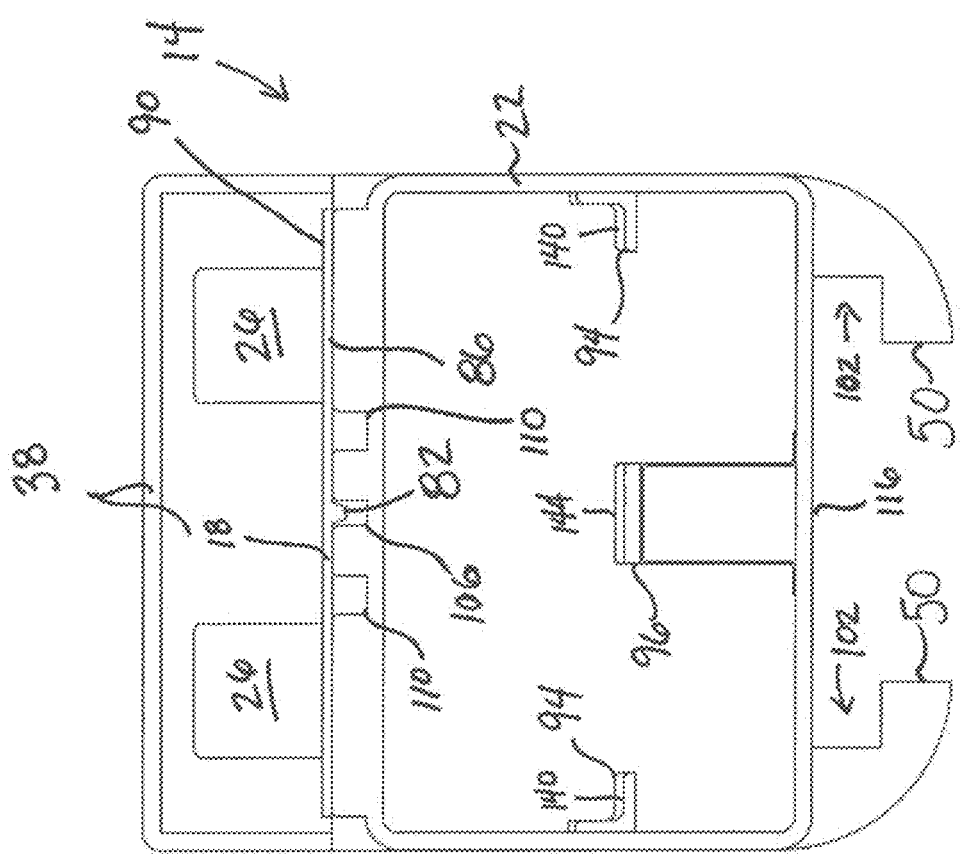
FIG. 9
FIG. 8

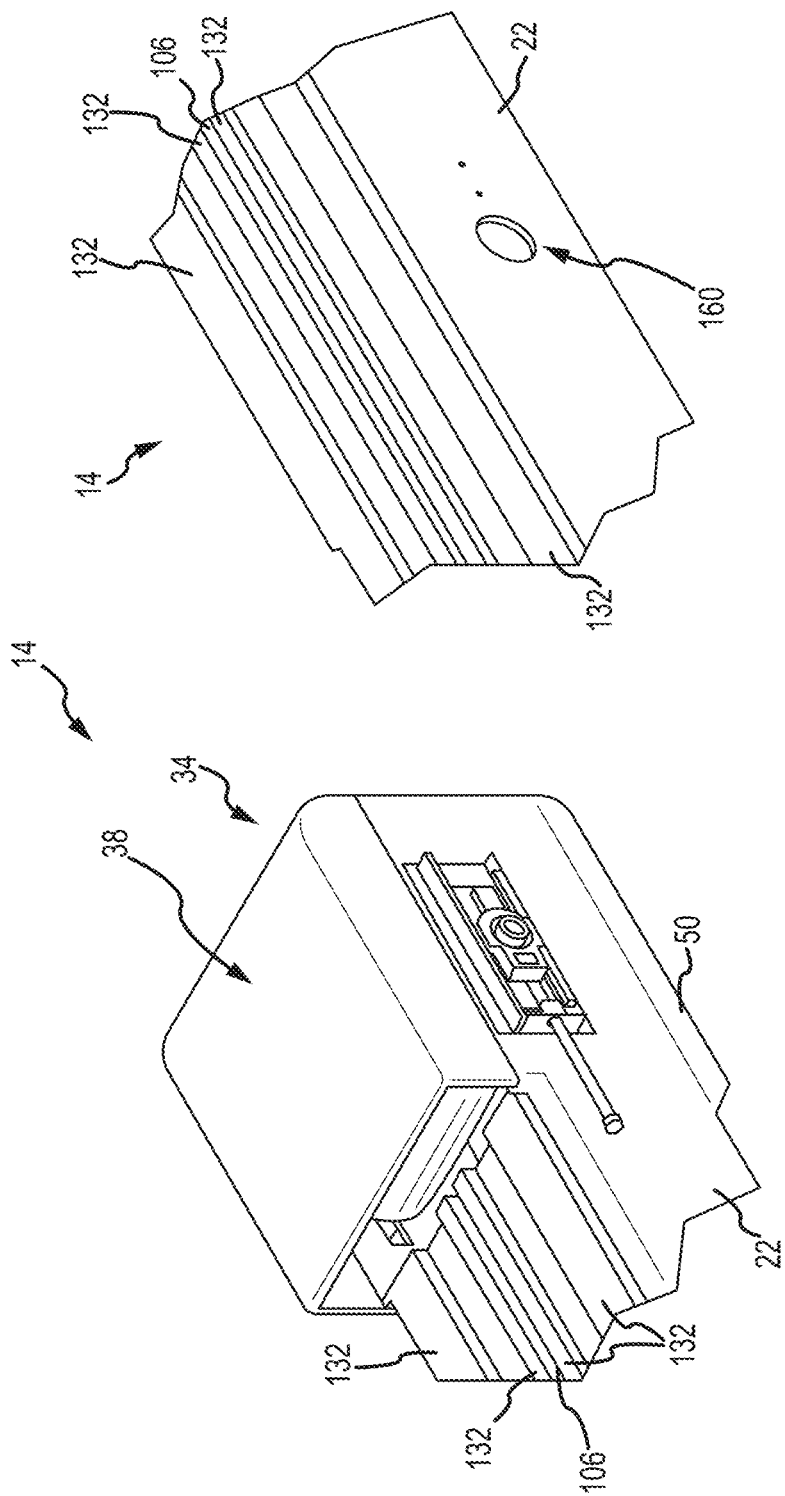

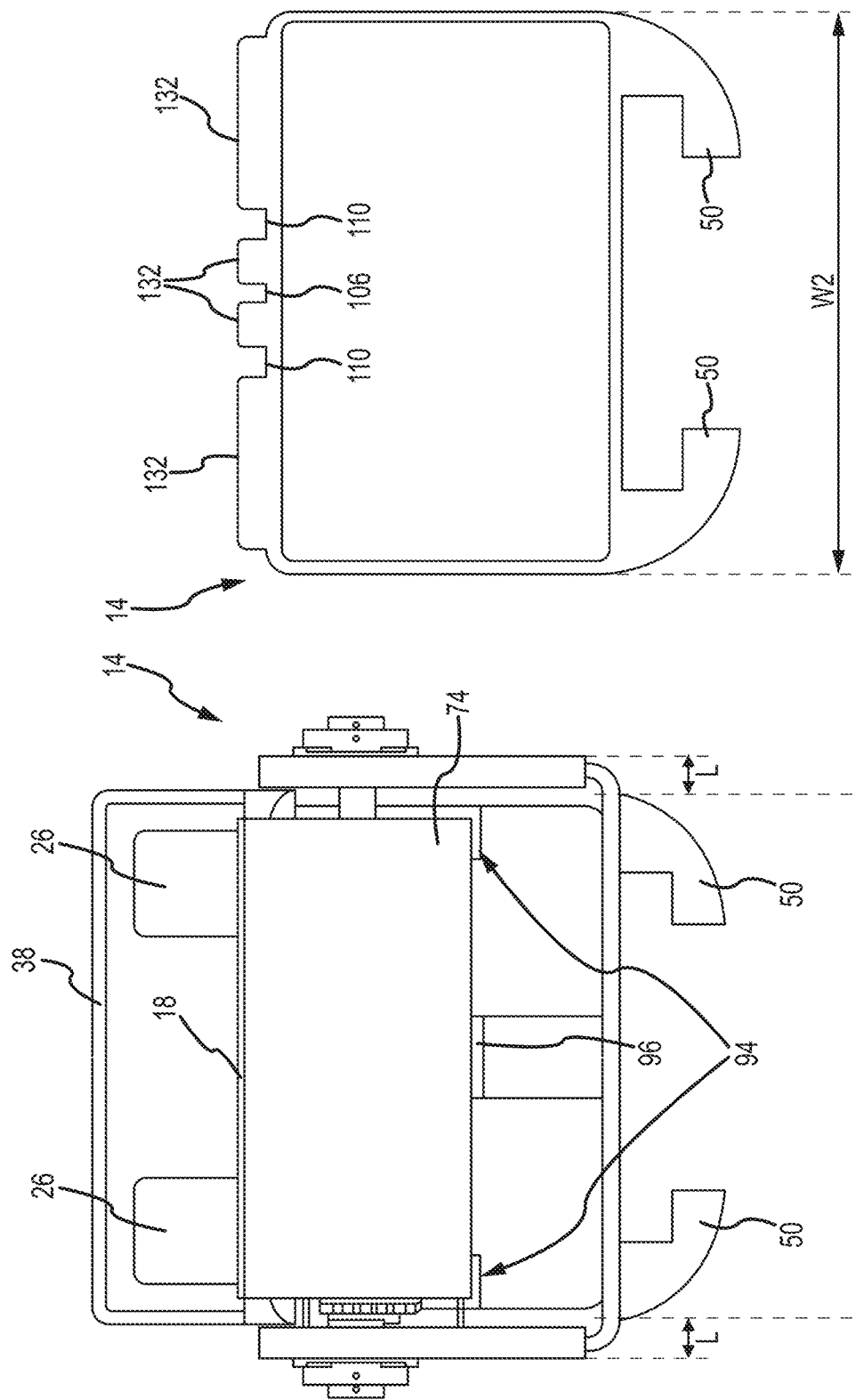

VEHICLE-MOUNTED CONVEYOR SYSTEM

CROSS REFERENCE TO RELATED APPLICATIONS

This application claims the benefit of U.S. patent application Ser. No. 16/431,628, filed on Jun. 4, 2019, entitled "VEHICLE-MOUNTED CONVEYOR SYSTEM", now U.S. Pat. No. 10,913,381 and issued on Feb. 9, 2021, which claims the benefit of U.S. Provisional Application No. 62/680,365, filed on Jun. 4, 2018, entitled "Vehicle-Mounted Conveyor System," the entire disclosures of which are incorporated by reference herein.

FIELD OF THE INVENTION

Embodiments of the present invention generally relate to a vehicle-mounted conveyor system, and more specifically a truck-mounted conveyor system with a fiber-reinforced plastic frame.

BACKGROUND OF THE INVENTION

Conveyors are typically used at one site and rolled around on wheels to move from specific location to location within the site. Conveyors typically cannot rotate right to left to change the orientation of the conveyor. Few conveyors exist that are interconnected to a vehicle such that they can be used at various sites, such as construction sites.

Existing truck-mounted conveyors usually require a CDL-rated truck. Further, truck-mounted conveyors commonly are used to convey articles and handle loose materials in construction, residential roof replacement, and agricultural applications.

Truck-mounted conveyors typically are constructed of steel and are, therefore, heavy. They also require a large support system and a large truck to support the weight of the conveyor system. Moreover, steel conducts electricity, which can be dangerous when operating the conveyor near power lines.

One prior art truck-mounted conveyor uses two fiber-reinforced plastic ("FRP") channels positioned side-by-side. The FRP channels are fastened together with non-FRP cross members to create a four-sided conveyor frame. Thus, the top and bottom surfaces of the conveyor frame are structurally non-FRP.

Additionally, some prior art vehicle-mounted conveyors include expensive, and at the expense of payload capacity, pallet-advancing systems built into the truck beds to draw the pallets closer to the loading point of the conveyor.

SUMMARY OF THE INVENTION

There exists a significant need for a safe and versatile vehicle-mounted conveyor system that can be attached to a non-CDL truck. These and other needs are addressed by the various embodiments and configurations of the present invention. Embodiments of this invention relate to a novel system, device, and methods for providing a vehicle-mounted conveyor system with a fiber-reinforced plastic tube frame. The novel vehicle-mounted conveyor system provided herein allows for a long conveyor provided on a short-length, non-CDL truck. "CDL" refers to a vehicle that is greater than 26,000 pounds GVWR and that requires a commercial driver's license to operate the vehicle.

It is one aspect of embodiments of the present invention to provide a vehicle-mounted conveyor system with an FRP conveyor frame. The frame may include a four-sided tube. In some embodiments, the FRP composite features low electrical conductivity, which is critical when working around overhead power lines. The term "fiber-reinforced plastic" or "FRP" encompasses fiberglass-reinforced plastic, fiberglass-reinforced polymer, etc. Additionally, the FRP frame discussed herein may not be entirely fiberglass and may contain other materials such as wood, metal, and other non-glass fibers.

It is a further aspect of embodiments of the present invention to provide a conveyor to convey a wide range of materials, including shingles, shakes (e.g., loose dirt, gravel, and rocks), tiles, underlayment, solar panels, siding, bricks, fasteners, etc.

In some embodiments, the conveyor system includes a frame with a four-sided FRP tube, a belt positioned on top of the tube, belt cleats, belt pulleys, a motor, a material backstop, and conveyor positioning features. Conveyor positioning features include a tilting hinge and carriage guide, a conveyor carriage, a telescopic vertical post, and a slewing drive.

It is another aspect of various embodiments of the present invention to provide a vehicle-mounted conveyor system with an FRP tube frame where all four sides (top, bottom, and both sides) are one integrally-formed FRP tube. This provides maximum conveyor rigidity. The FRP tube includes numerous custom design features that are integrally formed into the FRP tube upon fabrication.

One FRP tube feature in some embodiments is an integrated belt V-guide track located on the top or upper side of the tube. A typical belt V-guide consists of a small trapezoidal cross-section of plastic material that is bonded to the inside surface of a continuous conveyor belt. A V-guide typically works in conjunction with a track, channel, or groove located on the top side of a conveyor frame and in the outer surface of the belt pulleys and/or rollers. The V-guide and track help prevent belt misalignment, which occurs when forces act on the belt non-linearly to the typical direction of belt travel.

Another novel feature of the FRP tube design is an integrated carriage, which interconnect the FRP tube frame to the carriage guide or rails and the vertical post of the TMA. The carriage has two portions formed of FRP composite that are located on the exterior of the FRP tube. When the FRP tube frame and carriage are interconnected to the carriage guide and vertical post, the carriage and carriage guide limit the relative positioning of the two members to one degree of freedom. The one degree of freedom enables one aspect of the conveyor positioning functionality.

In one embodiment, the conveyor frame is a fiber-reinforced plastic tube configuration with various custom features. Specifically, the tube of the conveyor frame may have a four-sided configuration, which may be a rectangular, square, or other shaped configuration. In alternative embodiments, the conveyor frame may have a five-sided or six-sided shape.

It is another aspect of various embodiments of the present invention to provide a vehicle-mounted conveyor system with a conveyor carriage feature. The conveyor carriage feature enables the conveyor to be positioned forward for the delivery of roofing materials or other materials and then back to the road-travel position. These two positions and intermediate positions provide the methods for enabling a long conveyor on a short-length truck and for material loading versatility. In one embodiment, the system is similar to the conveyor carriage in the Discovery Design truck-mounted conveyor. However, the present invention is FRP and the Discovery Design conveyor is primarily of steel construction.

In some embodiments, the conveyor carriage feature is an integral part of the tube frame. In one embodiment, the carriage system is an interaction between a carriage having two sides that are formed to the exterior of the tube frame and the carriage guide interconnected to the vertical post and hinge of the truck mount assembly. The carriage and/or carriage guide may be comprised of an FRP composite, metal, plastic, combinations thereof, or other material known in the art. In some embodiments, the carriage guide is a non-FRP material and may be T-shaped to interconnect and fit with the carriage on the conveyor. The carriage form channels which serve to grip the sides of the guide and hold the tube frame and carriage together with the carriage guide as the conveyor frame slides forward and backward along the guide. In some embodiments, this actuation is provided by a hydraulic ram, a winch and cable system, a motorized slew drive, or other linear actuation systems.

In some embodiments, the carriage guide is fixed to the truck mount assembly ("TMA"). The TMA may also include a telescopic vertical post and a slewing drive. The telescopic vertical post enables one aspect of conveyor elevation positioning and may be actuated by a hydraulic ram. The slewing drive allows the telescopic vertical post and, thus, the conveyor carriage system to rotate about a vertical axis. The slewing drive may be actuated by a hydraulic motor.

The conveyor frame and other structural components of the conveyor system may be comprised of any mix of materials including FRP, metal, wood, plastics, etc., or the conveyor frame and/or other structural components of the conveyor system may be all one material. Additionally, components of the conveyor system (e.g., the belt, motor(s), pulley(s), etc.) may be comprised of additional materials, including but not limited to fabric, FRP, ceramic, composite materials, metal, wood, plastics, etc.

In one embodiment a conveyor system capable of being interconnected to a motor vehicle is provided comprising: a frame; a four-sided tube, wherein the four-sided tube is a fiber-reinforced plastic composite; a conveyor belt positioned on an upper surface of the four-sided tube; one or more cleats interconnected to the conveyor belt and positioned on an outer surface of the conveyor belt; a backstop positioned at one end of the four-sided tube; a carriage guide; at least one belt return slider; a motor to move the conveyor belt; a carriage interconnected to the four-sided tube; and a vertical post interconnected on a first end to a frame of a motor vehicle and interconnected on a second end to the conveyor carriage, wherein, the four-sided tube can be positioned in a first road-travel position and a second position of use.

In one embodiment a conveyor system capable of being interconnected to a motor vehicle is provided comprising: a four-sided tube, wherein the tube is a fiber-reinforced plastic composite; a conveyor belt positioned on an upper surface of the four-sided tube; one or more cleats interconnected to the conveyor belt and positioned on an outer surface of the conveyor belt; a backstop positioned at one end of the four-sided tube; a conveyor carriage interconnected to the four-sided tube; at least one belt return slider; a motor to move the conveyor belt; and a vertical post interconnected on a first end to a frame of the motor vehicle and interconnected on a second end to the conveyor carriage; wherein, the four-sided tube can be positioned in a first road-travel position and a second position of use.

In one embodiment, a conveyor system capable of being interconnected to a motor vehicle is provided comprising: a conveyor comprising: a four-sided tube frame; a conveyor belt positioned on an upper surface of the four-sided tube frame; one or more cleats interconnected to the conveyor belt and positioned on an outward facing surface of the conveyor belt; a backstop positioned at a load end of the conveyor; a carriage interconnected to a bottom portion of the four-sided tube frame and extending from the load end along the tube frame a predetermined distance; a plurality of belt return sliders; and a motor to move the conveyor belt; a vertical post interconnected on a first end to a frame of the motor vehicle and interconnected on a second end to a hinge; a carriage guide interconnected to the hinge, wherein the conveyor carriage slides along the carriage guide; and wherein the conveyor can be positioned in a first road-travel position and a second position of use.

In some embodiments, when the conveyor is in the first road-travel position, the conveyor is substantially parallel to a longitudinal axis of the motor vehicle. In various embodiments, the four-sided tube frame is integrally formed of a material such that the four sides are integrally interconnected, and the tube frame is a fiber-reinforced plastic composite. In some embodiments, the tube frame is formed from four individual side portions secured to one another to form a four-sided shape. Additionally or alternatively, the four-sided tube frame has a rectangular shape in cross section. In various embodiments, the conveyor system further comprises a plurality of cleats, wherein the plurality of cleats comprises one or more groups of cleats, and wherein each group of cleats comprises at least two cleats positioned proximate one another. In some embodiments, the carriage is integrally formed with the tube frame. Further, the tube frame can further comprise a channel in the upper surface of the tube frame, the belt comprises a V-guide positioned on an under surface of the belt, and wherein the V-guide is positioned in the channel. In various embodiments, the belt return sliders are rollers.

In one embodiment, a conveyor capable of being interconnected to a motor vehicle is provided comprising: a tube frame having a top side interconnected to a first side and a second side, a bottom side interconnected to the first side and the second side, a longitudinal length extending from a load end to a top end, and a channel in an upper surface of the top side, the channel extending the longitudinal length, wherein the tube frame is a fiber-reinforced plastic composite; a carriage interconnected to the bottom side of the four-sided tube frame and extending from the load end along the tube frame a predetermined distance, wherein the carriage is comprised of two carriage portions, and each carriage portion forms a carriage groove; a conveyor belt positioned on the upper surface of the top side of the tube frame and extending from the load end of the conveyor to the drive end of the conveyor; a plurality of cleats interconnected to the conveyor belt and positioned on an outward facing surface of the conveyor belt, wherein the plurality of cleats comprises one or more groups of cleats, and wherein each group of cleats comprises at least two cleats; a backstop positioned at the load end of the conveyor; a plurality of belt return sliders, wherein some belt return sliders are interconnected to an inner surface of the first side of the tube frame, some belt return sliders are interconnected to as inner surface of the second side of the tube frame, and some belt return sliders are interconnected to an inner surface of the bottom side of the tube frame; and a motor to move the conveyor belt and positioned between the first side and the second side of the tube frame.

In various embodiments, the conveyor further comprises contact surfaces on the upper surface of the top side of the tube frame, wherein an under surface of the conveyor belt will slide along the contact surfaces, and the contact surfaces are coated with a ceramic epoxy. In some embodiments, the first side and the second side have a width that remains substantially constant along the longitudinal length of tube frame when viewed in cross section. In various embodiments, the first side and the second side have a width that remains substantially constant from the top side to the bottom side of tube frame when viewed in cross section.

In one embodiment, a method of using a conveyor system capable of being interconnected to a motor vehicle is provided comprising: providing a conveyor comprising: a load end; a drive end opposite the load end; a frame having an upper surface and a channel in the upper surface; a conveyor belt positioned on an upper surface of the frame, the conveyor belt comprising a V-shaped guide on an under surface of the conveyor belt; a plurality of cleats interconnected to the conveyor belt and positioned on an outward facing surface of the conveyor belt; a carriage interconnected to a bottom portion of the frame and extending from the load end along the frame a predetermined distance; and a motor to move the conveyor belt; interconnecting the conveyor belt to the frame via a first roller at the load end and a second roller at the drive end; positioning the V-shaped guide in the channel of the frame; providing a vertical post to be interconnected on a first end to a frame of the motor vehicle; interconnecting a second end of the vertical post to a hinge; interconnecting the hinge to a carriage guide; interconnecting the carriage of the conveyor to the carriage guide such that the carriage can slide along the carriage guide; positioning the conveyor in a first road-travel position; and positioning the conveyor in a second position of use.

In various embodiments, the method further comprises providing a slewing drive interconnected to the vertical post and/or the hinge, and rotating the conveyor between about 90 degrees and about 180 degrees relative to the vertical post. In some embodiments, the frame of the conveyor is comprised of fiber-reinforced plastic composite. Additionally or alternatively, when the conveyor is in the second position of use, positioning the load end of the conveyor proximate to material to convey and positioning the drive end of the conveyor proximate to a desired final location of the material. In various embodiments, the method further comprises providing a ceramic epoxy coating on the upper surface of the frame.

In at least one embodiment, a conveyor system capable of being interconnected to a motor vehicle comprises: a conveyor comprising: a conveyor frame having an upper plate and a lower plate coupled to a pair of channel flanges and one or more bearings disposed on each of the pair of channel flanges; a conveyor belt positioned on an upper surface of the conveyor frame; a plurality of belt return sliders; and a first motor to move the conveyor belt, wherein the conveyor can be positioned in a first road-travel position and a second position of use; and a conveyor carriage feature comprising: a carriage frame interconnected to a bottom portion of the conveyor frame, the carriage frame including a pair of bars parallel to and spaced from each other and a plurality of cross bars coupling the pair of bars; and a linear rail system interconnected to the carriage frame and the conveyor frame, the linear rail system including at least one chain, at least one sprocket, a second motor, a coupling bracket, and a pair of channels, the second motor configured to rotate the at least one sprocket, the at least one sprocket configured to rotate the at least one chain, the coupling bracket affixed to the chain and the conveyor frame, each of the pair of channels coupled to a corresponding bar of the pair of bars, the pair of channels configured to receive at least one of the one or more bearings, wherein the coupling bracket is configured to linearly move when the chain rotates, thereby causing the one or more bearings to slide in the pair of channels and linearly move the conveyor frame.

In various embodiments, when the conveyor is in the first road-travel position, the conveyor is substantially parallel to a longitudinal axis of the motor vehicle. In various embodiments, the linear rail system also includes a first gear and a second gear, wherein the second motor is configured to rotate the first gear, the first gear is configured to rotate the second gear, and the second gear is configured to rotate the at least one sprocket. In some embodiments, the at least one sprocket includes a first pair of sprockets and a second pair of sprockets. In various embodiments, the first pair of sprockets is disposed at a first end of the conveyor frame and the second pair of sprockets is disposed at a second end of the conveyor frame. In some embodiments, the first pair of sprockets is rotated by the second gear.

In various embodiments, the coupling bracket includes a plate having an upper surface and a lower surface and a pair of protrusions extending from the lower surface and the conveyor frame is coupled to the coupling bracket on the upper surface. In various embodiments, the at least one chain includes a pair of chains, and each of the pair of protrusions includes a pair of apertures positioned at opposite ends. In various embodiments, each aperture receives a link of a corresponding chain. In various embodiments, the conveyor system further comprises a turntable assembly affixed to a pair of frame rails, the turntable assembly coupled to the conveyor and configured to provide azimuth movement to the conveyor; and at least one frame rail support affixed to the pair of frame rails. In various embodiments, the at least one frame rail support is a C-shaped channel insert inset into a corresponding frame rail. In some embodiments, the at least one frame rail is a plurality of plate inserts inserted between two flanges of a corresponding frame rail. In various embodiments, the at least one frame rail is a plate insert positioned near an outer position of two flanges of a corresponding frame rail.

In at least one embodiment, a conveyor capable of being interconnected to a motor vehicle comprises; a load end; a top end opposite the load end; a tube frame having a top side interconnected to a first side and a second side, a bottom side interconnected to the first side and the second side, a longitudinal length, and a plurality of bearings coupled to each of the first side and the second side; a carriage frame interconnected to the bottom side, the carriage frame including a pair of bars parallel to and spaced from each other and a plurality of cross bars coupling the pair of bars; a linear rail system interconnected to the carriage frame and the tube frame, the linear rail system including a pair of chains, a first gear, a second gear, a first pair of sprockets, a second pair of sprockets, a first motor, a coupling bracket, and a pair of channels, the first motor configured to rotate the first gear, the first gear configured to rotate the second gear, the second gear configured to rotate the first pair of sprockets, the first pair of sprockets configured to rotate the pair of chains, and the pair of chains configured to linearly move the coupling bracket, the coupling bracket affixed to the chain and the tube frame, each of the pair of channels coupled to a corresponding bar of the pair of bars, the pair of channels configured to receive the plurality of bearings, wherein the coupling bracket is configured to linearly move when the pair of chains rotates, thereby causing the plurality of bearings to slide in the pair of channels and linearly move the tube frame; a conveyor belt positioned on the upper surface of the top side of the tube frame and extending from the load end of the conveyor to the drive end of the conveyor; a plurality of cleats interconnected to the conveyor belt and positioned on an outward facing surface of the conveyor belt, wherein the plurality of cleats comprises one or more groups of cleats, and wherein each group of cleats comprises at least two cleats; a backstop positioned at the load end of the conveyor; a plurality of belt return sliders; and a second motor to move the conveyor belt and positioned between the first side and the second side of the tube frame.

In various embodiments, the coupling bracket includes a plate having an upper surface and a lower surface and a pair of protrusions extending from the lower surface and the conveyor frame is coupled to the coupling bracket on the upper surface. In various embodiments, each of the pair of protrusions includes a pair of apertures positioned at opposite ends and each aperture receives a link of a corresponding chain. In various embodiments, the first gear and the second gear are each a spur gear. In various embodiments, the conveyor system further comprising a turntable assembly affixed to frame rails and at least one frame rail support. In various embodiments, the turntable assembly is coupled to the conveyor and configured to provide azimuth movement to the conveyor.

In at least one embodiment, a conveyor system comprises: a conveyor comprising: a conveyor frame having an upper plate and a lower plate coupled to a pair of channel flanges and a pair of bearings disposed on each of the pair of channel flanges; a conveyor belt supported by the conveyor frame; and a first motor to move the conveyor belt; a conveyor carriage feature comprising: a carriage frame interconnected to a bottom portion of the conveyor frame, the carriage frame including a pair of bars parallel to and spaced from each other and a plurality of cross bars coupling the pair of bars; and a linear rail system interconnected to the carriage frame and the conveyor frame, the linear rail system including at least one chain, at least one sprocket, a second motor, a coupling bracket, and a pair of channels, the second motor configured to rotate the at least one sprocket, the at least one sprocket configured to rotate the at least one chain, the coupling bracket affixed to the chain and the conveyor frame, each of the pair of channels coupled to a corresponding bar of the pair of bars, the pair of channels configured to receive at least one of the pair of bearings; wherein the coupling bracket is configured to linearly move as the chain rotates, thereby causing the pair of bearings to slide along the pair of channels and linearly move the conveyor frame; a turntable assembly affixed to a pair of frame rails, the turntable assembly coupled to the conveyor and configured to provide azimuth movement to the conveyor; and at least one frame rail support coupled to the pair of frame rails.

In various embodiments, the at least one frame rail support is a C-shaped channel insert inset into a corresponding frame rail. In some embodiments, the at least one frame rail is a plurality of plate inserts inserted between two flanges of a corresponding frame rail. In various embodiments, the at least one frame rail is a plate insert positioned near an outer position of two flanges of a corresponding frame rail. In various embodiments, the linear rail system also includes a first gear and a second gear, wherein the second motor is configured to rotate the first gear, the first gear is configured to rotate the second gear, and the second gear is configured to rotate the at least one sprocket.

For purposes of further disclosure, the following references generally related to conveyor systems and vehicle-mounted conveyor systems are hereby incorporated by reference in their entireties:

U.S. patent Ser. No. 16/279,827 to Job Bacon-Maldonado, III et al., filed on Feb. 19, 2019, and entitled "Vehicle-Mounted Conveyor System";

U.S. Pat. No. 9,260,247 issued to Miller et al. on Feb. 16, 2016;

U.S. Patent Publication No. 2006/0182575 to Richard Pogue published on Aug. 17, 2006;

U.S. Patent Publication No. 2005/0279616 to Richard Pogue published on Dec. 22, 2005;

U.S. Patent Publication No. 2009/0010747 to Richard Pogue published on Jan. 8, 2009;

U.S. Patent Publication No. 2009/0294246 to Richard Pogue published on Dec. 3, 2009;

U.S. Pat. No. 9,783,093 issued to James Esch on Oct. 10, 2017;

U.S. Pat. No. 6,871,868 issued to Richard Pogue on Mar. 29, 2005;

U.S. Pat. No. 7,909,153 issued to Richard Pogue on Mar. 22, 2011;

U.S. Pat. No. 5,685,687 issued to Robert Frye on Nov. 11, 1997;

U.S. Pat. No. 8,876,455 issued to Richard Pogue on Nov. 4, 2014; and

U.S. Pat. No. 5,984,077 issued to Robert Frye on Nov. 16, 1999.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

FIG. 8 is a cross-sectional view of the conveyor taken at line 8-8 of FIG. 7;

FIG. 9 is a cross-sectional view of a conveyor frame according to some embodiments of the present invention;

FIG. 11B is an enlarged view of detail B of FIG. 11;

FIG. 11C is an enlarged view of detail C of FIG. 11;

FIG. 12 shows a front elevation view of the drive end of a conveyor according to some embodiments of the present invention;

FIG. 13 is a cross-sectional view of a conveyor frame according to some embodiments of the present invention;

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
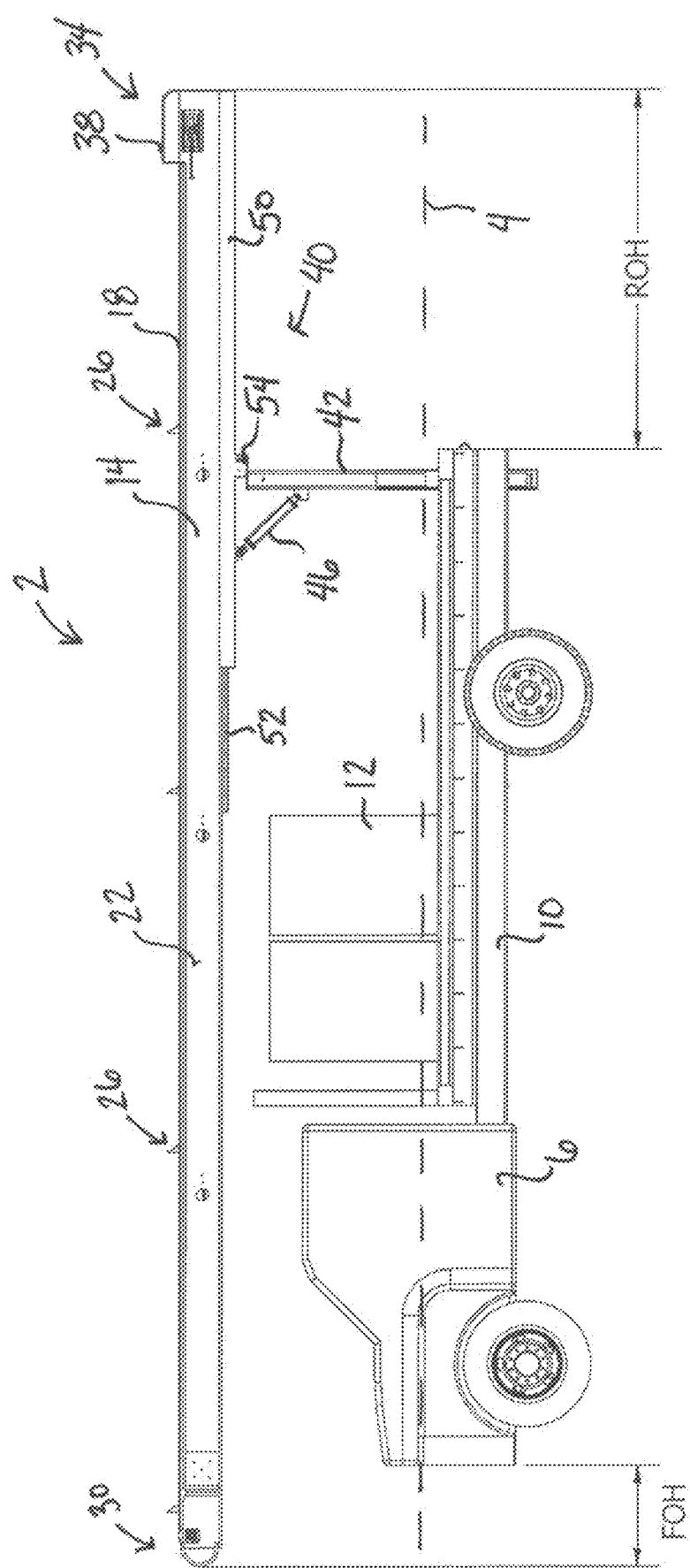
FIG. 1 shows a side view of a vehicle with a vehicle-mounted conveyor system according to some embodiments of the present invention in a first road-travel position.
Figure 2:
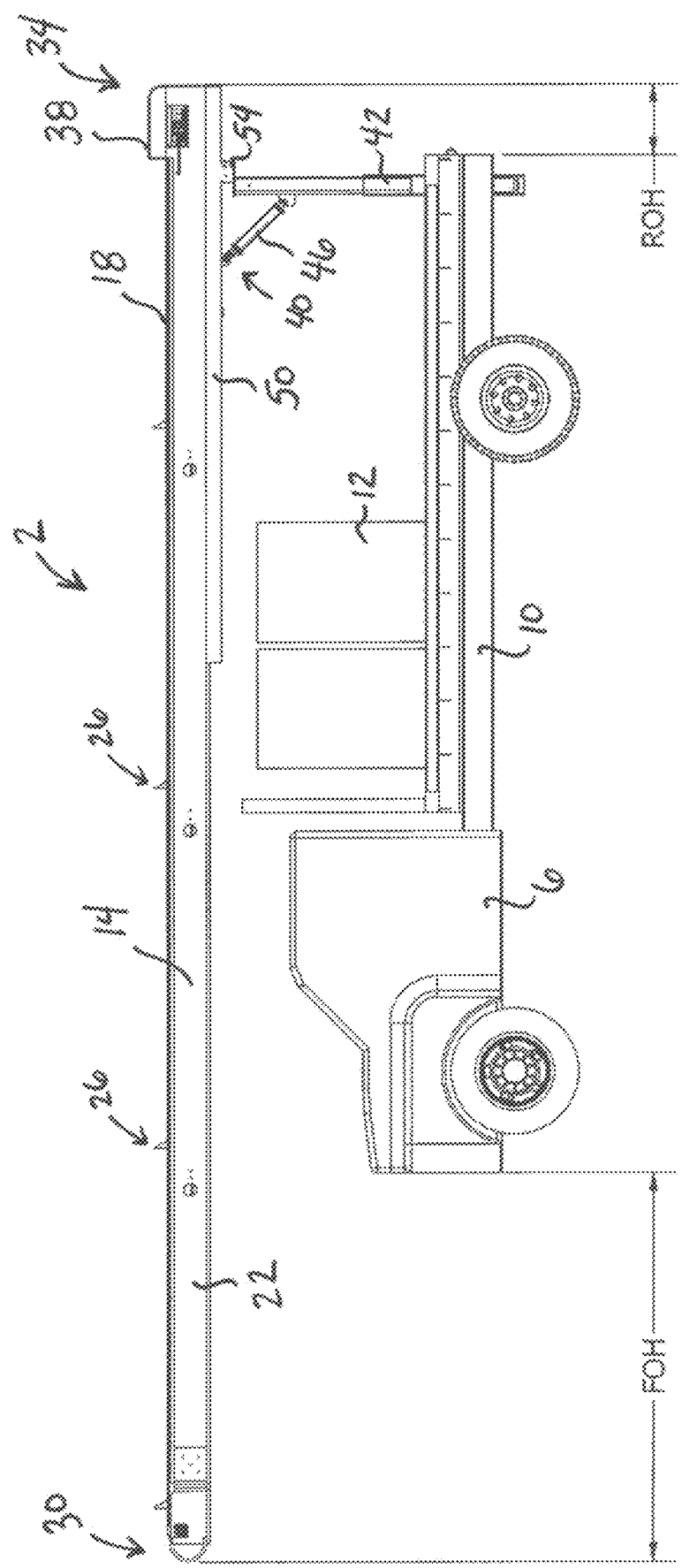
FIG. 2 shows a side view of a vehicle with a vehicle-mounted conveyor system according to some embodiments of the present invention in a second road-travel position, which may also be an operation position.

FIGS. 1 and 2 show two different road-travel positions for the truck-mounted conveyor system 2. The longitudinal axis 4 of the vehicle 6 is shown by line 4. In the embodiment shown, the conveyor system 2 is mounted on a Ford F-650 non-CDL truck 6. Here, the embodiment shown is a 41-foot overall length ("OAL") conveyor 14 mounted on top of the Ford truck 6 with an approximate bed 10 length of 17.5 feet (213.8 in.). The conveyor system 2 includes the conveyor 14 and the truck mount assembly (TMA) 40. The conveyor 14 includes a conveyor belt 18, cleats 26 interconnected to the upper or outward facing surface of the belt 18, a frame 22, a top end 30 (also called the forward end in this position or the drive end), and a bottom end 34 (also called the rear end in this position or the load end). The bottom end 34 has a backstop 38. The backstop 38 may also be called a guard and is removable. The backstop 38 can be any known material, including metal, plastic, composite, wood, ceramic, combinations thereof, and any other material known in the art. The cleats 26 can be any known material, including metal, plastic, polymer, composite, wood, ceramic, rubber, combinations thereof, and any other material known in the art. The conveyor belt 18 can be any known material used in the art for conveyor belts, including woven fabric, for example, woven polyester. The conveyor belt 18 may be natural materials, synthetic materials, or combinations thereof.

The TMA 40 includes a vertical post 42 (which can be a telescoping vertical post in some embodiments), an arm member 46 interconnected on one end to a side of the vertical post 42 and interconnected on the other end to a carriage guide 52, a hinge 54 fixed or secured to the upper end of the vertical post 42 and interconnected to the carriage guide 52, and a slewing drive (not shown in this view). The carriage guide 52 is stationary relative to the hinge 54 and vertical post 42. The conveyor 14 slides along the carriage guide 52 via the carriage 50. The hinge 54 may be off centered from the vertical post 42 (as shown) or directly in line with the vertical post 42 in various embodiments. The carriage guide 52 is not visible in FIG. 2 because it is completely covered by the carriage 50. The arm member 46 can be a telescoping arm, hydraulic arm, fixed arm member, or any other type of arm known or used in the art.

The slewing drive rotates the conveyor 360 degrees around the vertical post 42. The carriage feature 50, 52 enables the maximum conveyor 14 length possible on the minimum truck 6 length possible. Without the carriage 50 and carriage guide 52, the conveyor 14 would only be approximately 31 feet long on a truck 6 of the size shown in FIGS. 1 and 2. The conveyor carriage 50 also offers the ability to draw the conveyor 14, when it is in an elevated position, into the bed length and closer to the palletized shingles or other material 12 to transport. Other manufacturers offer expensive, and at the expense of payload capacity, pallet advancing systems built into the truck bed 10 to draw the pallets closer to the loading point of the conveyor 14. However, the embodiments of the present invention do not need an expensive pallet advancing system to function efficiently.

FIGS. 1 and 2 show the functionality of the truck-mounted conveyor system 2, specifically the conveyor carriage feature 50, 52, with respect to vehicle load overhang laws for road-travel, i.e., to fit the longest overall length conveyor 14 on the shortest overall length vehicle 6 possible and comply with overhang laws. These laws are set at the state level, but they generally allow no more than 3 feet of load length projecting beyond the front of the vehicle (i.e., front-overhang or FOH) and no more than 10 feet of load length projecting beyond the rear of the vehicle 6 (rear-overhang or ROH). FIGS. 1 and 2 show the FOH and ROH dimensions. In some embodiments, when the conveyor 14 is in the position shown in FIG. 1, the front overhang FOH is between about 30 in. and about 36 in. and the rear overhand ROH is between about 110 in. and about 120 in. In a preferred embodiment, the front overhang FOH is about 34 in. and the rear overhand ROH is about 119 in. In some embodiments, when the conveyor 14 is in the position shown in FIG. 2, the front overhang FOH is between about 120 in. and about 140 in. and the rear overhand ROH is between about 10 in. and about 25 in. In a preferred embodiment, the front overhang FOH is about 133 in. and the rear overhand ROH is about 20 in.

In some embodiments, FIG. 1 depicts the conveyor 14 in its most rearward position and FIG. 2 depicts the conveyor 14 in its most forward position. FIG. 1 shows a conveyor 14 configuration that complies with typical road-travel overhang laws and is referred to as the "road-travel position." The fully-forward position (FIG. 2) may be called a second road travel position or the operation position. However, the conveyor belt 18 is technically operable at both positions shown in FIGS. 1 and 2 and any position in between.

Figure 3:
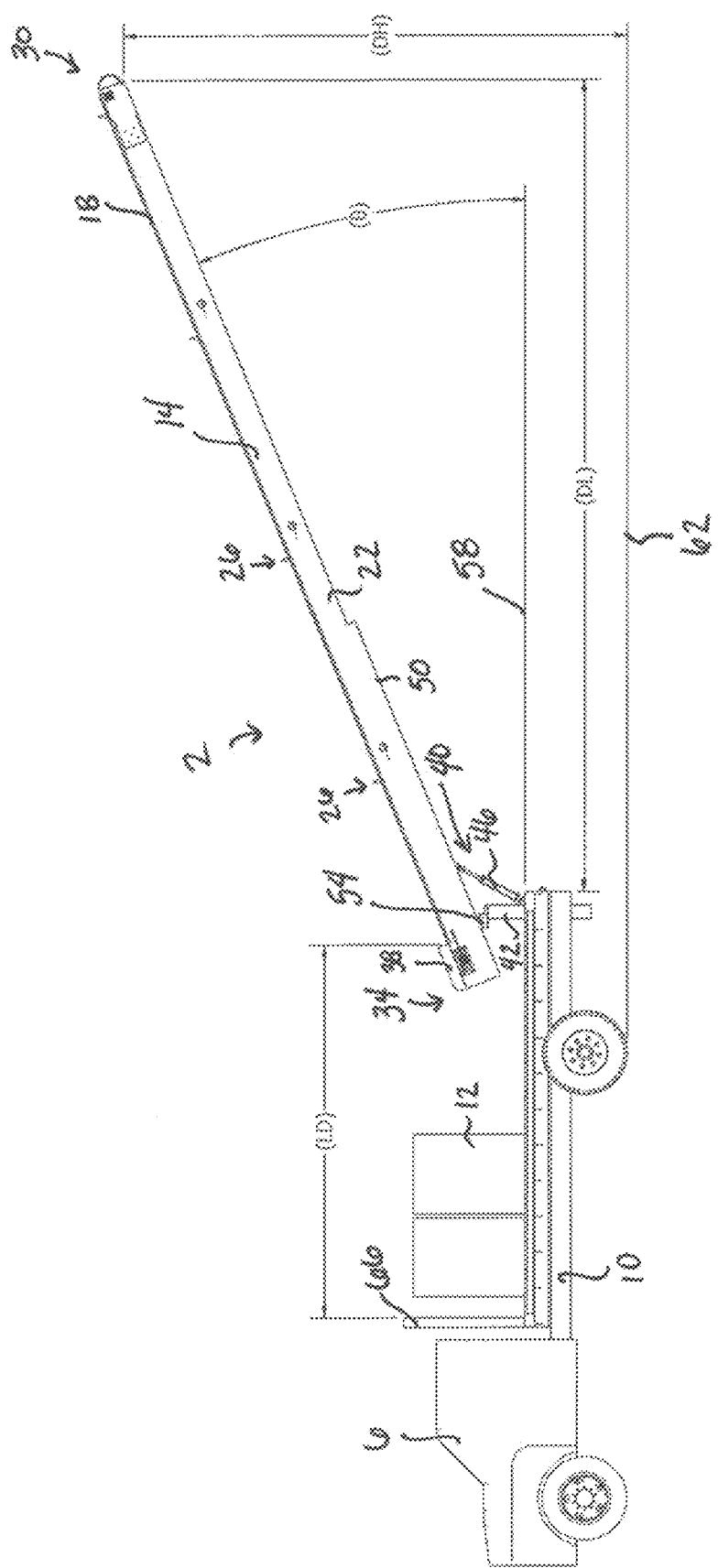
FIG. 3 shows a side view of a vehicle with a vehicle-mounted conveyor system according to some embodiments of the present invention in an extended position of use or an operating position.
Figure 4:
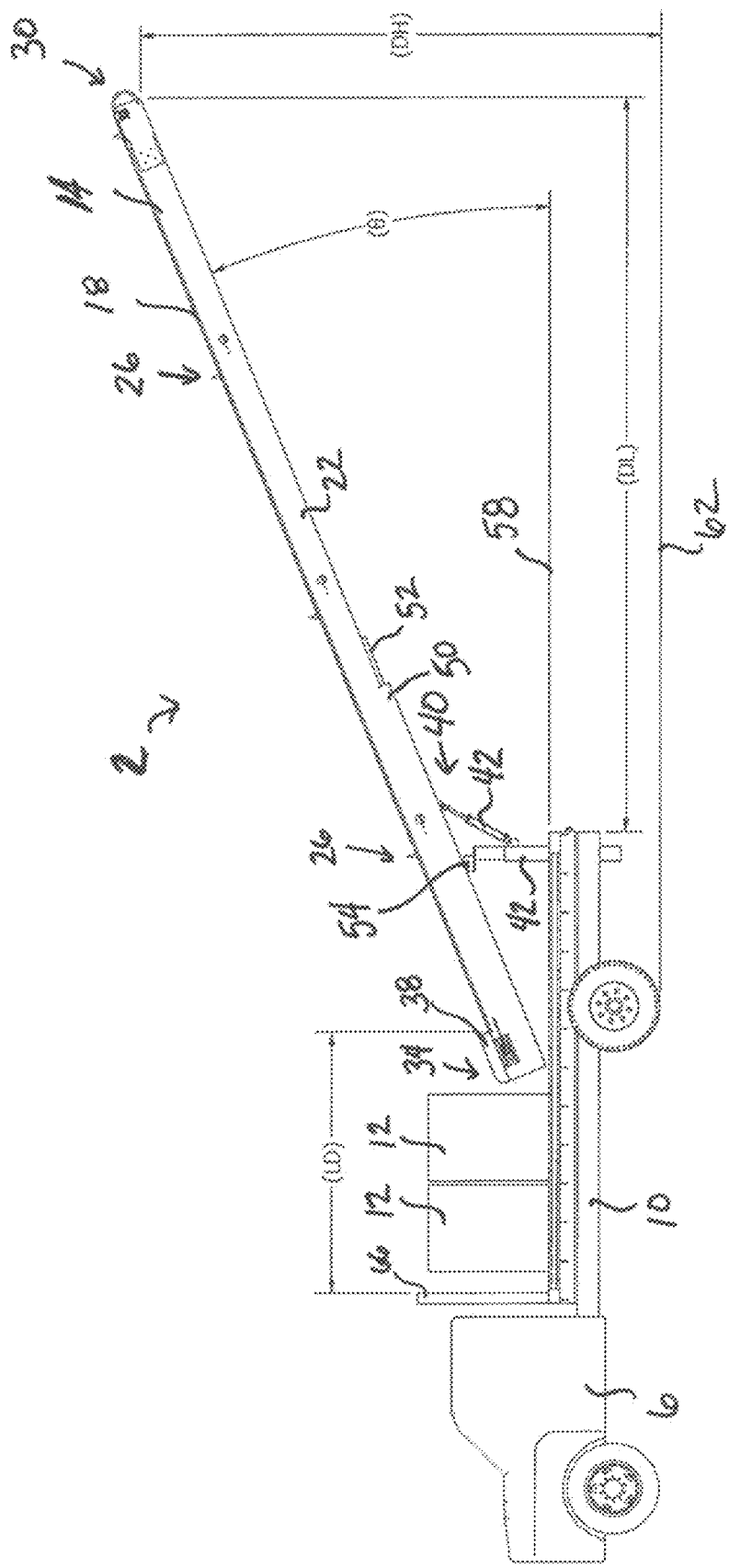
FIG. 4 shows a side view of a vehicle with a vehicle-mounted conveyor system according to some embodiments of the present invention in a second extended position of use or a second operating position.

FIGS. 3-6 show the conveyor 14 in various extended positions of use or operating positions. Specifically, FIGS. 3 and 4 show the versatility of the truck-mounted conveyor system 2 with respect to material 12 loading, i.e., utilizing the conveyor positioning features 40, 50, 52 to make material 12 loading easier for the operator.

FIG. 3 depicts the conveyor 14 slewed to about 180 degrees from its road-travel position and the conveyor 14 is positioned at an angle theta θ (i.e., conveyor incline or incline angle) relative to a horizontal plane 58. The conveyor carriage 50 is in its fully forward position, i.e., the conveyor carriage 50 and conveyor 14 are as far forward as they go, with some material load distance LD, conveyor discharge length DL, and conveyor discharge height DH. Additionally, the hinge 54 is as close to the bottom end 34 of the conveyor 14 as it goes. The discharge height DH is measured from the ground 62 to the top end 30 of the conveyor 14. The discharge length DL is measured from the rear end of the truck bed 10 to the top end 30 of the conveyor 14. The load distance LD is measured from the front end 66 of the truck bed 10 to the end of the backstop 38.

In FIG. 3, the dimensions of the conveyor position can vary depending on the desired use. Typically, the incline angle θ of the conveyor during use is between about 15 degrees and about 40 degrees. With the maximum material load distance LD of about 15'7" in some embodiments, the discharge length DL is between about 25 ft. and 38 ft and the discharge height DH is between about 15 ft. and about 30 ft. In FIG. 4, the material load distance LD is shorter, i.e., between about 12'6" and about 5'0". Thus, the discharge length DL is shorter. These dimensions are for some embodiments only and are subject to change based on the exact set-up, conveyor length, vehicle dimensions, and conveyor embodiment.

FIG. 4 depicts the conveyor 14 with the same incline angle θ and discharge height DH as FIG. 3, but with a decreased material load distance LD at the expense of the conveyor discharge length DL, i.e., shorter discharge length DL. This configuration is possible with the conveyor carriage 50, carriage guide 52, and telescoping vertical post 42 functionalities. In FIG. 4, the conveyor 14 is repositioned at some point between its most forward position and most rearward position. The vertical post 42 is raised to maintain a constant discharge height DH and incline angle θ.

Figure 5:
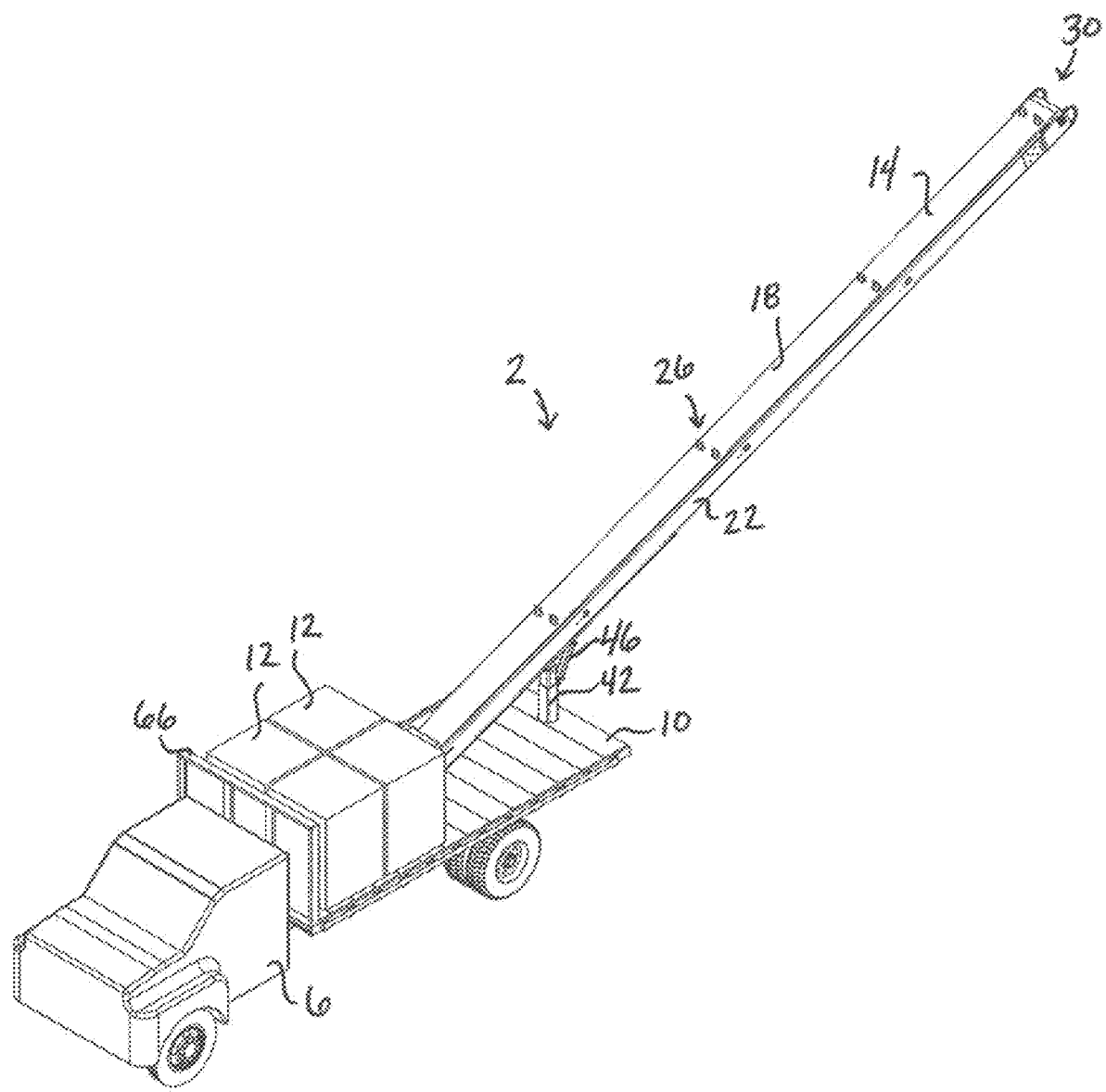
FIG. 5 shows a side perspective view of a vehicle with a vehicle-mounted conveyor system according to some embodiments of the present invention in the second extended position of use or the second operating position.
Figure 6:
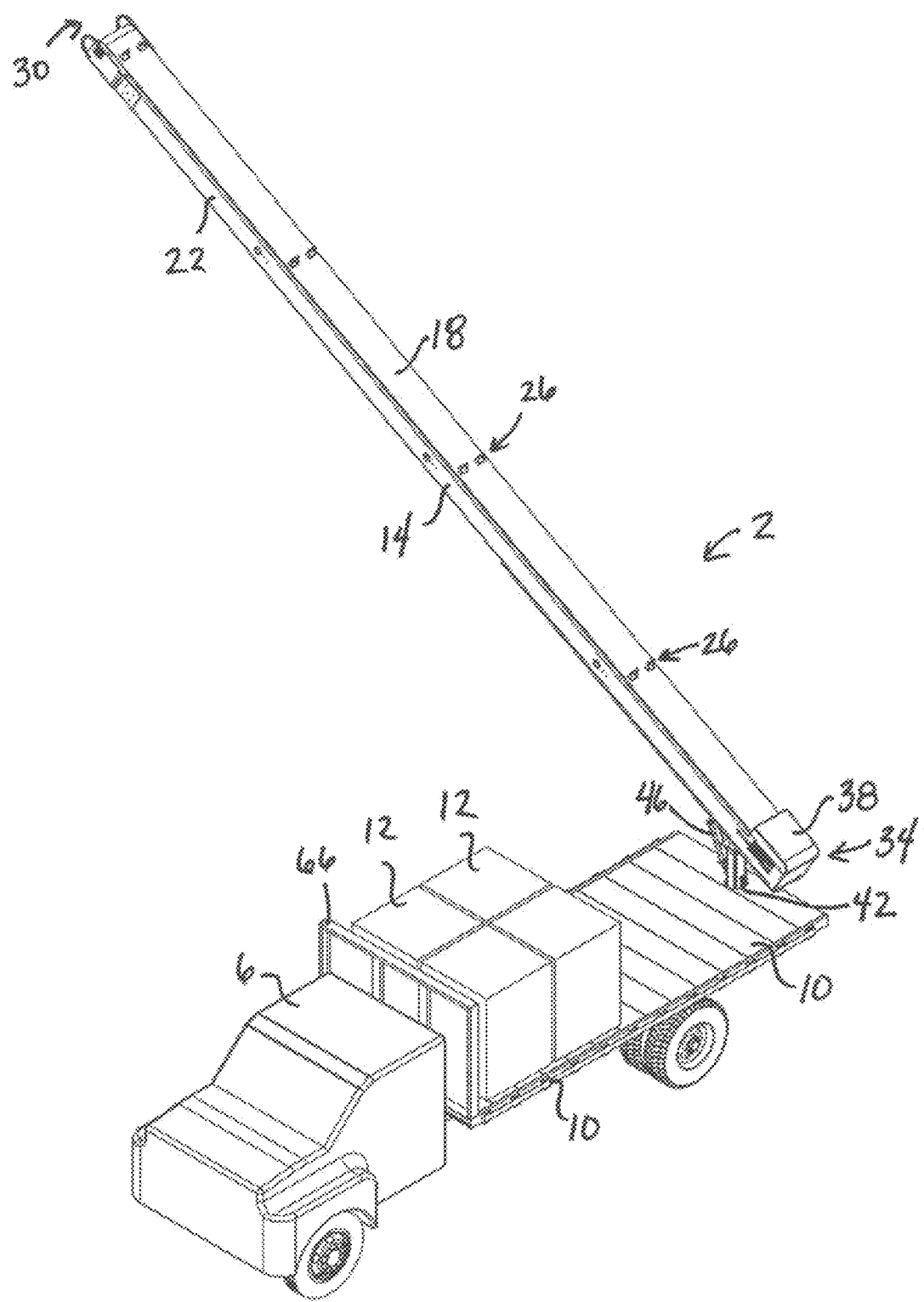
FIG. 6 shows a side perspective view of a vehicle with a vehicle-mounted conveyor system according to some embodiments of the present invention in a third extended position of use or a third operating position.

FIGS. 5 and 6 show additional material 12 loading positions for the conveyor system 2. FIG. 5 depicts the conveyor 14 in a position that aids in material 12 loading and is similar to the position shown in FIG. 4. FIG. 6 depicts the conveyor 14 slewed about 90 degrees and the conveyor 14 in its forward-most position, i.e., similar to FIG. 3 but with the conveyor 14 slewed about 90 degrees.

Figure 7:
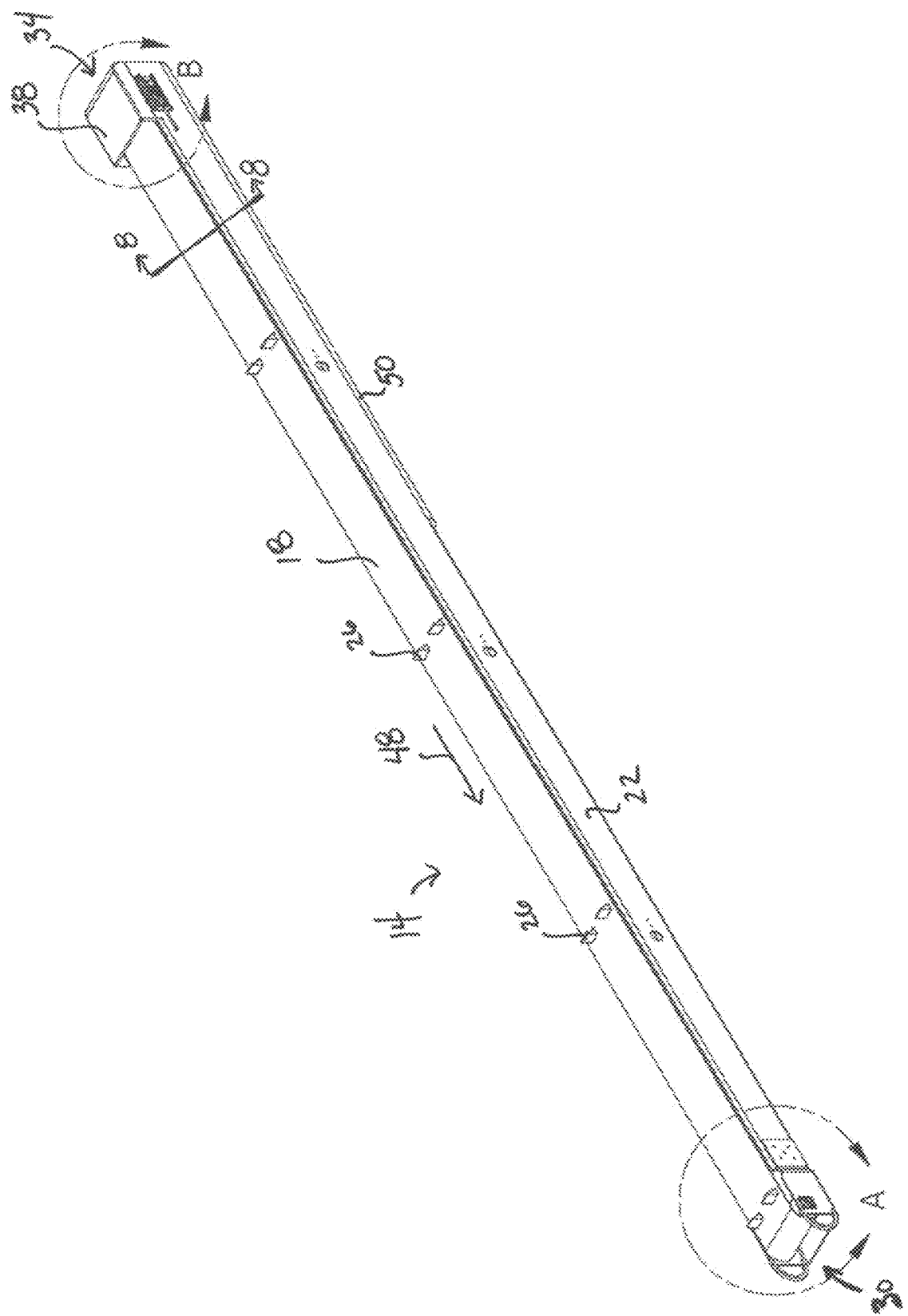
FIG. 7 shows a perspective view of a conveyor according to some embodiments of the present invention.

FIGS. 7-10 include details of the conveyor system 2 and features of the fiber-reinforced plastic (FRP) tube conveyor 14. FIG. 7 shows the conveyor 14 with the belt 18 rotating around the frame 22 and cleats or support elements 26 interconnected to the outer or upper surface of the conveyor belt 18. The conveyor 14 has a drive (top) end 30 and an idle (bottom or load) end 34. The direction of belt travel is shown by arrow 48.

Figure 7B:
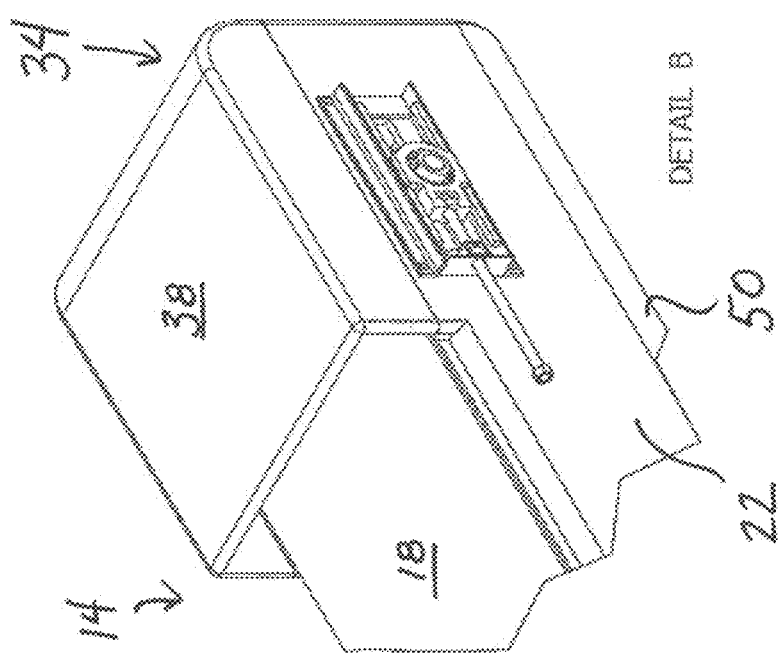
FIG. 7B is an enlarged view of detail B of FIG. 7.
Figure 7A:
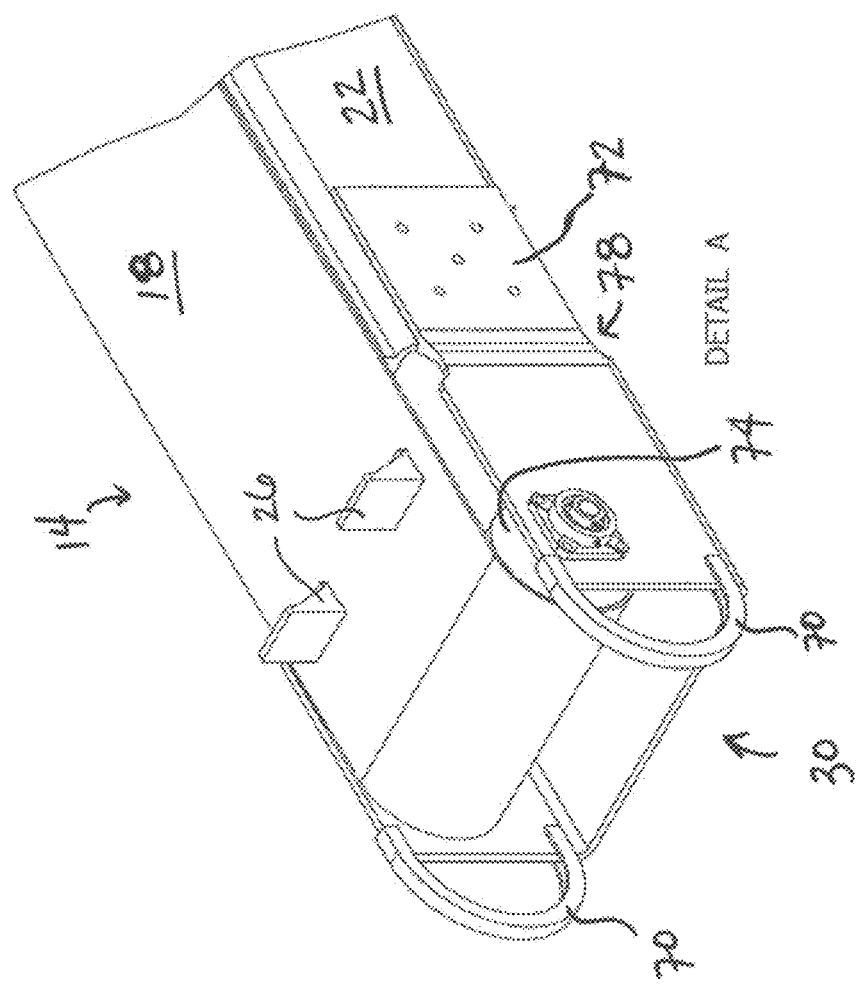
FIG. 7A is an enlarged view of detail A of FIG. 7.

FIG. 7A is Detail A and shows the drive (top) end 30 of the conveyor 14, the cleats 26, handles 70, roller 74, frame 22, and belt 18. This embodiment includes a "hammerhead" design, which fits all the drive components—including the pulley, motor, roller 74, roller chain, sprockets, and sprocket drive—inside the conveyor frame 22. The hammerhead design includes a top drive end 30 that flares out 78 slightly on both sides from the main conveyor frame width to allow for the internal placement of the hydraulic motor and other drive components, thereby eliminating the side guard that is problematic on prior art conveyors. Both sides of the top drive end 30 are flared out to the hammerhead style to equalize the resistance that bundles experience as they cross this point of the conveyor 14. The arrow for 78 is actually pointing to where the hammerhead portion bends inward and reduces its width to the width of the rest of the frame 22. The drive end 30 is bolted or secured via a panel 72 to the remainder of the frame 22.

FIG. 7B is Detail B and shows the idle (bottom or load) end 34 of the conveyor 14, the backstop 38, conveyor belt 18, frame 22, and carriage 50.

FIG. 8 is a cross-sectional view of the conveyor 14 taken along line 8-8 of FIG. 7. The conveyor 14 has a belt 18, a backstop 38, and a frame 22. The belt 18 has a V-guide 82 interconnected to the inner or inward facing surface 86 of the belt 18 and cleats 26 interconnected to the outer or outward facing surface 90 of the belt. The frame 22 includes belt return sliders 94, 96, a carriage 50 having two side portions, and a channel 106 for the V-guide 82. The carriage 50 extends from the bottom surface 116 of the frame 22 and forms carriage grooves 102 to receive and interconnect to the carriage guide 52 (shown in FIG. 1). The carriage 50 and carriage grooves 102 limit the frame 22 and carriage 50 to one degree of freedom relative to the carriage guide 52 and TMA 40. The belt return sliders 94, 96 include side sliders 94 and a center slider 96. In some embodiments, the belt return sliders are rollers rather than the L- and U-shaped portions shown in the drawings. The belt 18 is positioned on a top or upper surface 140, 144 of the belt return sliders 94, 96. The V-guide 82 is positioned in and works in conjunction with the track or channel 106 in the top or upper surface 120 of the conveyor frame 22. The frame 22 may have additional grooves 110 in the top or upper surface 120 to reduce the overall weight of the frame 22 and conveyor 14.

FIG. 9 is a cross-sectional view of the four-sided FRP tube frame 22 taken proximate line 8-8 of FIG. 7, but with the belt and backstop removed. The four sides include the upper surface 120 or upper portion, which is interconnected to a left side 124 and a right side 128, which are interconnected to the bottom surface 116 or bottom portion. The frame 22 may be all one piece integrally formed or may be separate components secured together using typical securing mechanisms known in the art, e.g., using adhesives. The frame 22 may have a rounded rectangular shape when viewed in cross section, or any other shape desired, e.g., circular or oval. The left and right sides 124, 128 may have substantially consistent cross sections or widths W (i.e., thicknesses) from the upper surface 120 to the bottom surface 116 and from the front (top) end to the rear (bottom end). In alternative embodiments, the cross-sectional shape and/or width W of the left and right sides 124, 128 of the frame may vary along the length or height of the frame 22. For example, the width of the side walls may taper and get thicker closer to the bottom surface.

FIGS. 8 and 9 show two major features of some embodiments of the present invention: (1) the belt V-guide track 106 on the top/upper surface 120 and the two carriage portions 50 on the bottom/lower surface 116 of the tube frame 22. Additionally, FIGS. 8 and 9 show the contact surfaces 132 on the top or upper surface 120 of the four-sided tube frame 22. The bottom or under surface 86 of the conveyor belt 18 will slide along these contact surfaces 132. The contact surfaces 132 may be coated with a ceramic epoxy for longer wear life and to reduce the friction between the belt 18 and the contact surfaces 132. At the center of the top surface 120 of the tube frame 22, a belt tracking feature or groove 106 is provided to guide a V-guide component 82 that is bonded along the center of the bottom or under surface 86 of the conveyor belt 18. Starting proximate the loading or bottom end 34 of the tube frame 22 and up to a predetermined distance along the tube frame 22, the frame 22 has a structural FRP composite carriage 50 consisting of two portions positioned along both bottom corners of the tube frame to grip and hold the carriage guide 52. In other embodiments, the carriage 50 portions may be positioned on the two vertical sides 124, 128 of the tube frame 22. The carriage 50 is fixed to the conveyor frame 22 and slides along the carriage guide 52, which is fixed to the vertical post 42 of the truck mount assembly 40. In some embodiments, various methods and mechanisms are used to move the conveyor 14 forward and backward. For example, the conveyor 14 may be moved using a motorized slew drive, hydraulics, or a winch and cable system.

Figure 10:
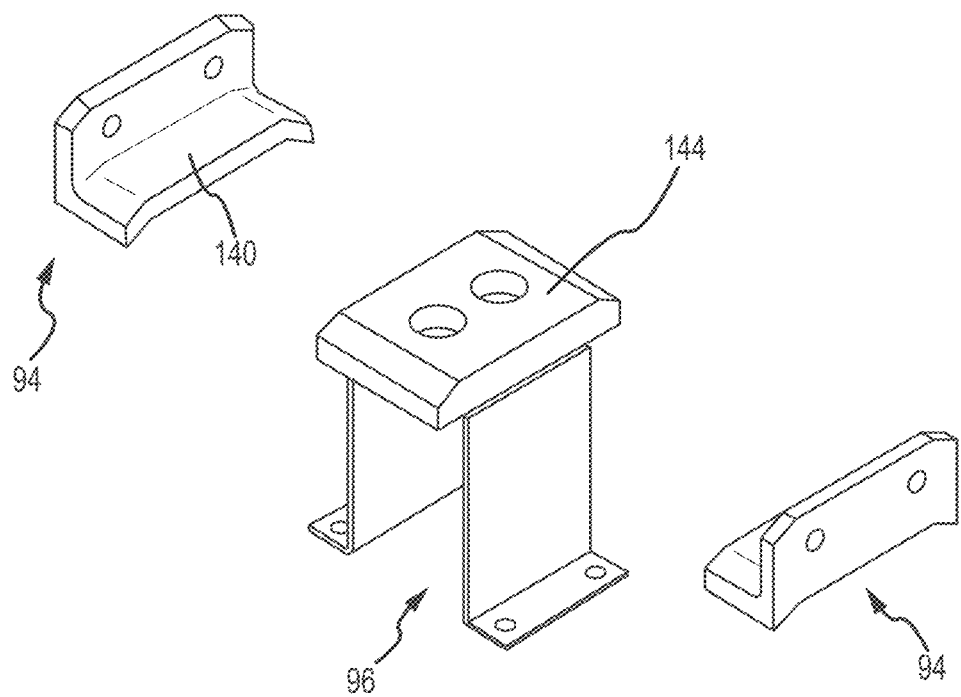
FIG. 10 shows belt return sliders according to some embodiments of the present invention.

FIG. 10 shows one embodiment of the belt return sliders 94, 96. The system includes at least two side sliders 94 and a center slider 96. The upper surfaces 140, 144 of the belt return sliders 94, 96 engage the conveyor belt to keep the belt positioned correctly. The belt return sliders 94, 96 can be any known material, including metal, composite, ceramic, wood, plastic, combinations thereof, or any other material known and used in the art. As discussed, these belt return sliders 94, 96 could be replaced with rollers in other embodiments.

Figure 11:
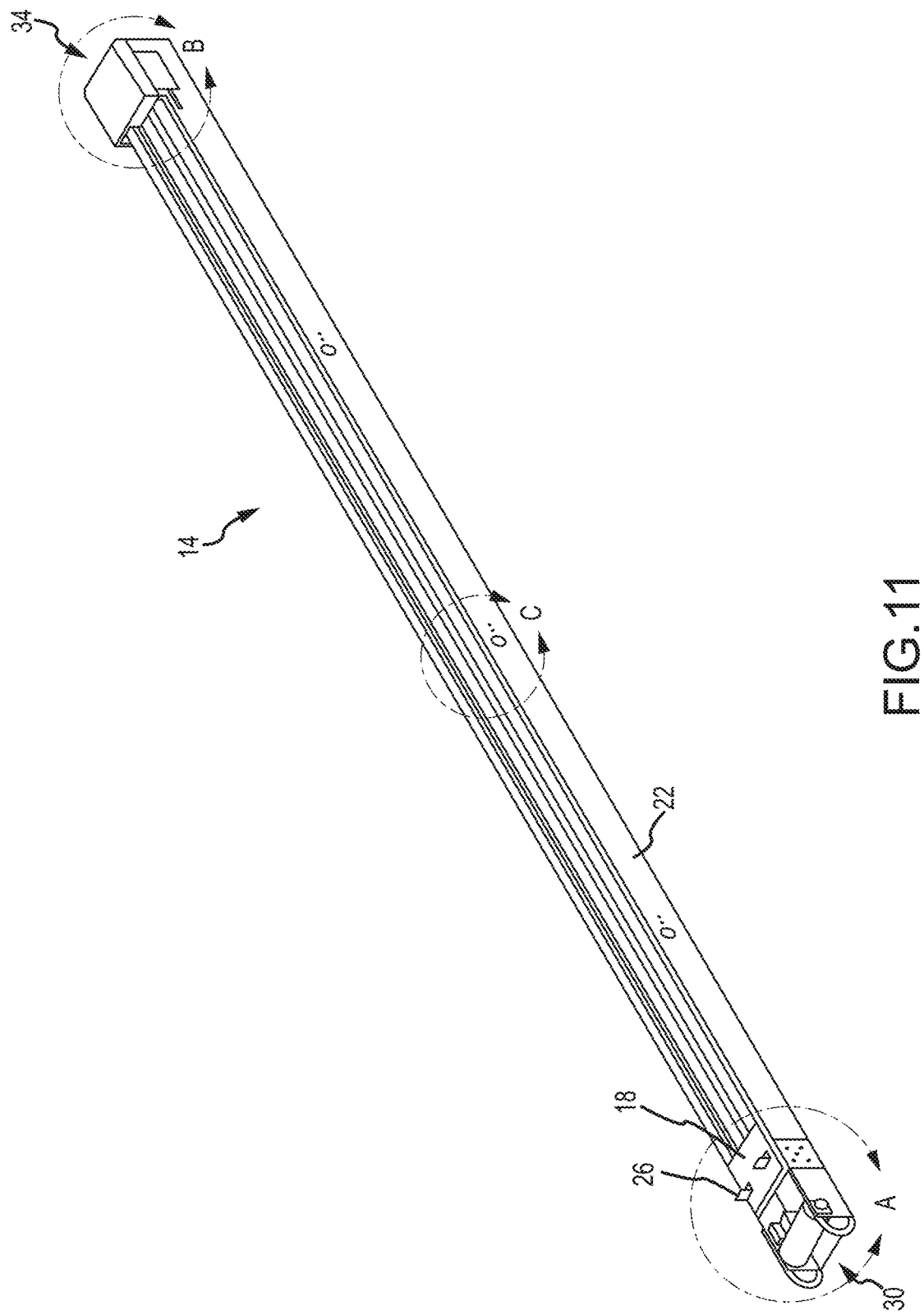
FIG. 11 shows a perspective view of a conveyor according to some embodiments of the present invention.

FIGS. 11-13 include details of the conveyor system 2 and features of the fiber-reinforced plastic (FRP) tube conveyor 14. FIG. 11 shows the conveyor 14 with only a portion of the belt 18 on the frame 22. The conveyor 14 has a drive (top) end 30 and an idle (bottom or load) end 34.

Figure 11A:
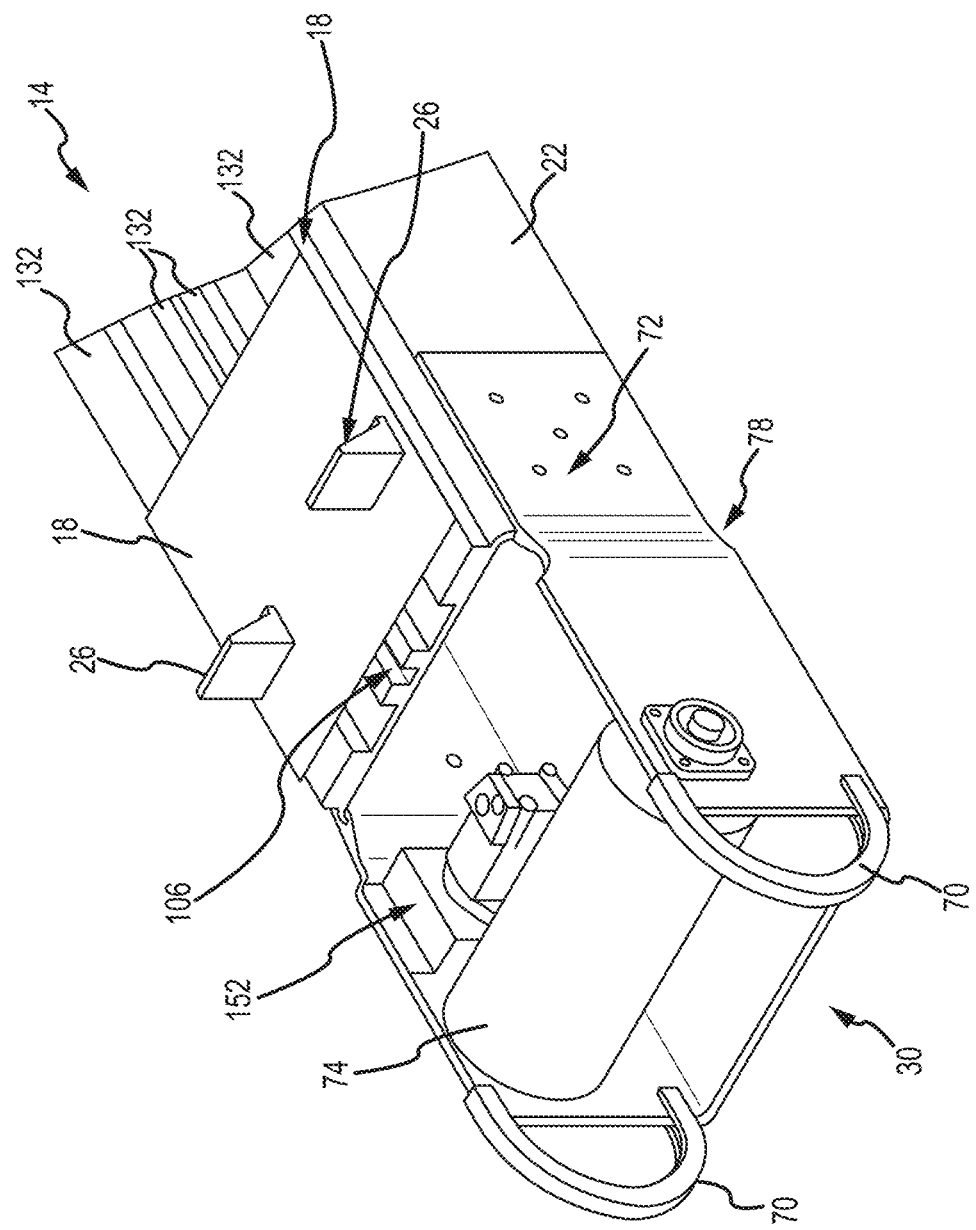
FIG. 11A is an enlarged view of detail A of FIG. 11.

FIG. 11A is Detail A and shows the drive (top) end 30 of the conveyor 14 with the frame 22 and only a portion of the belt 18 and two cleats 26. The drive end 30 has two handles 70, a roller 74, and the internal chain and sprocket drive 152 in the expanded or hammerhead portion 78 of the frame 22. The drive end 30 is bolted or secured via a panel 72 to the remainder of the frame. The arrow for 78 is actually pointing to where the hammerhead portion bends inward and reduces its width to the width of the rest of the frame 22. This embodiment includes a "hammerhead" design, which fits all the drive components—including the pulley, motor, roller 74, roller chain, sprockets, and sprocket drive 152—inside the conveyor frame 22. The hammerhead design includes a top end 30 that flares out 78 slightly on both sides from the main conveyor frame width to allow for the internal placement of the hydraulic motor and other drive components, thereby eliminating the side guard that is problematic on prior art conveyors. In this view, the V-guide track or channel 106 in the top or upper surface of the conveyor frame 22 is visible. The frame 22 may have additional grooves in the upper surface to reduce the overall weight of the frame 22 and conveyor 14. The contact surfaces 132 on the top or upper surface of the tube frame 22 are also visible because only a portion of the belt 18 is shown. The bottom or under surface of the conveyor belt 18 will slide along these contact surfaces 132. The contact surfaces 132 may be coated with a ceramic epoxy for longer wear life and to reduce the friction between the belt 18 and the contact surfaces 132.

FIG. 11B is Detail B and shows the idle (bottom or load) end 34 of the conveyor 14, the backstop 38, frame 22, and carriage 50. The upper surface of the frame 22 has a V-guide track or channel 106, additional grooves, and contact surfaces 132.

FIG. 11C is Detail C and shows an access hole 160 formed into the tube frame 22 to install and service belt-return carrying components and belt return sliders. The upper surface of the frame 22 has a V-guide track or channel 106, additional grooves, and contact surfaces 132.

FIG. 12 is a front elevation view of the conveyor 14 as viewed from the top or drive end. The belt roller 74 position is clearly shown. The roller 74 is sized and positioned such that the belt 18 rolls over the top of the roller 74 and runs along the top of the frame 22. On the bottom, the belt 18 runs between the top surfaces of the belt return guides 94, 96 and the bottom of the roller 74. The cleats 26 are interconnected to the belt 18 and positioned such that they do not interfere with the belt return guides 94 as the belt 18 rotates. Thus, the cleats 26 may need to be positioned closer together such that they do not interfere with the side belt return guides 94. Additionally, the hammerhead design of the drive end is shown in FIG. 12. The frame 22 extends a length L beyond the outer surface of the carriage portions 50. Compare FIG. 12 to FIG. 13. Thus, the hammerhead top end of the conveyor 14 is 2L wider than the width W2 of the rest of the frame 22. The width of the hammerhead top end is W2+L+L.

FIG. 13 is a cross-sectional view of the four-sided FRP tube frame 22 taken between Detail B and Detail C of FIG. 11, but with the belt and backstop removed. This figure is similar to FIG. 9 and duplicative description will not be provided here. In this view, the carriage portions 50, V-guide track or channel 106, additional grooves 110, and contact surfaces 132 are visible.

Figure 14:
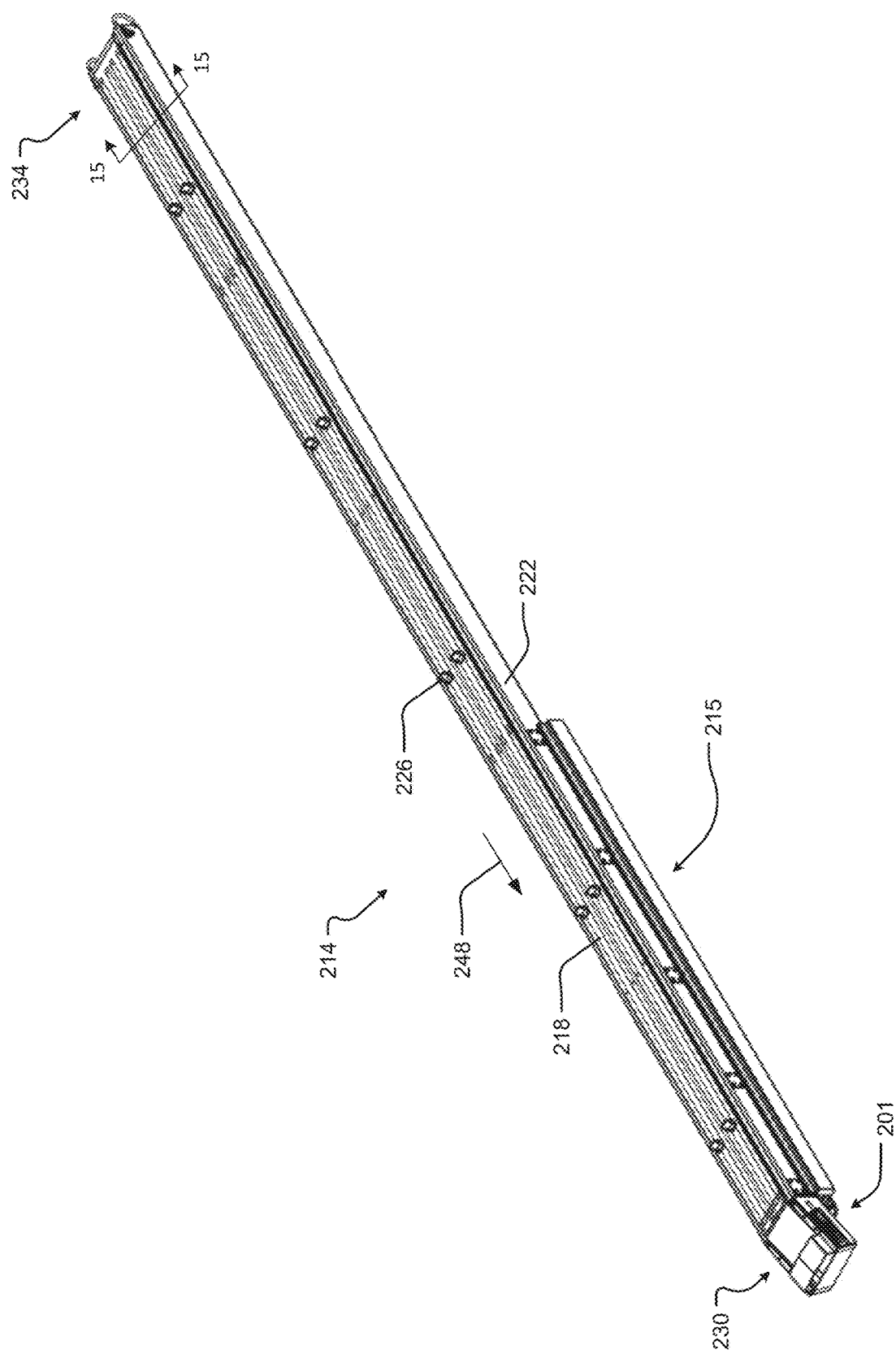
FIG. 14 is an isometric view of a conveyor according to some embodiments of the present invention.

Turning to FIG. 14, another embodiment of a conveyer 214 and a carriage feature 215 is shown. In some embodiments, the conveyer 214 is between about 30.0 feet long to about 70.0 feet long. In other embodiments, the conveyor 214 is between about 40.0 feet long to about 60.0 feet long and preferably the conveyor is about 50.0 feet long. It will be appreciated that the conveyer 214 may be less than 30.0 feet or greater than 70.0 feet. The conveyer 214 includes a belt 218 that moves along and rotates around a frame 222 and has cleats or support elements 226 interconnected to an outer or upper surface of the belt 218. In some embodiments, the frame 222 is a tubular frame constructed from pultruded fiberglass shapes or fiber reinforced plastic shapes that are bonded together with adhesive. In other embodiments, the frame 222 is a tubular frame constructed from a single pultruded cross-section. Other embodiments include a frame 222 constructed of metal pieces welded together. In other embodiments, all pieces of the frame 222 may come from standard protrusion shapes. The conveyor 214 has a drive or discharge end 234 and an idle or load end 230. As illustrated, a portion 201 of the top end 234 may be disposed at an angle relative to the frame 222. The direction of belt travel is shown by arrow 248.

Figure 15:
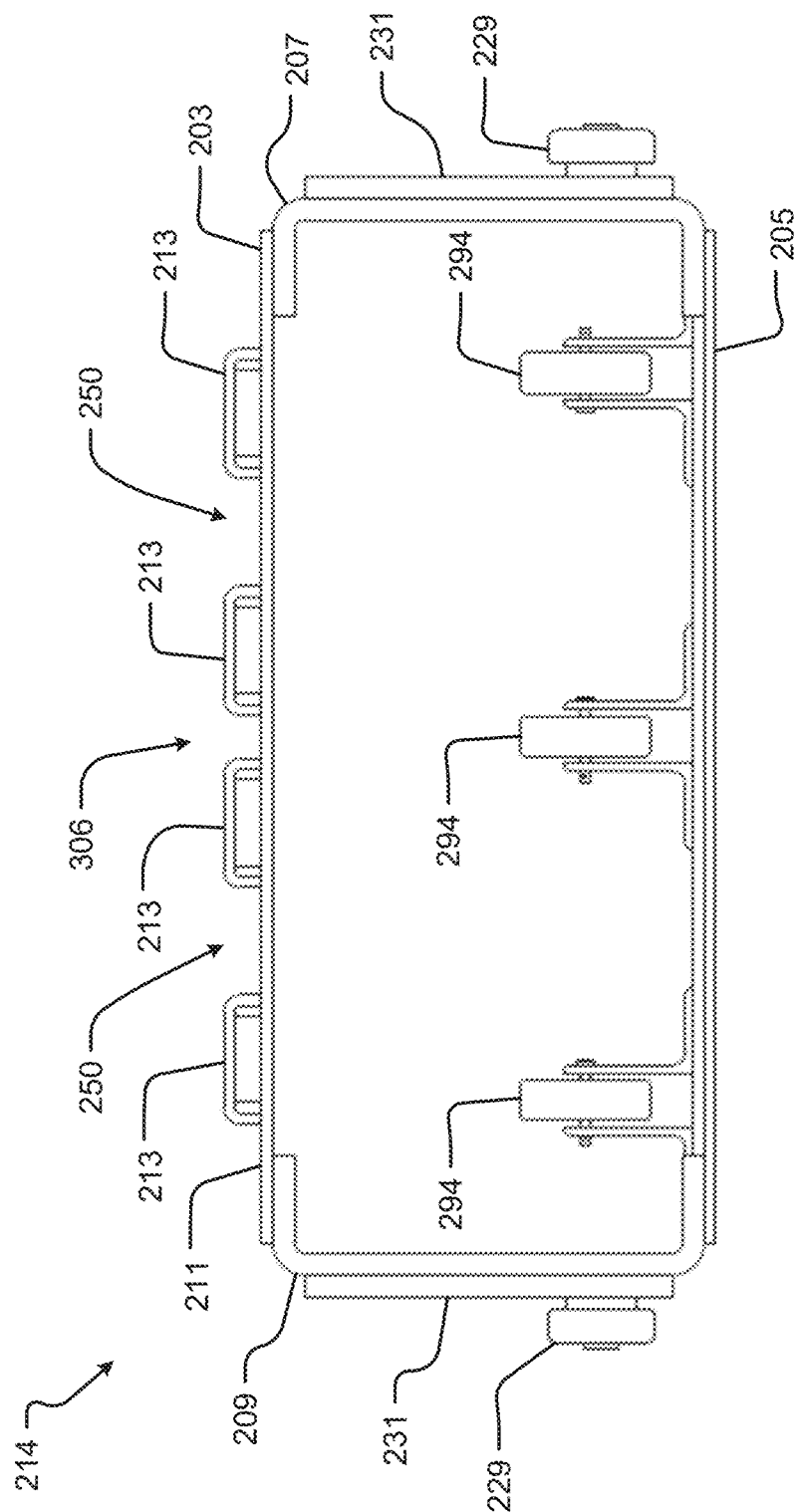
FIG. 15 is a cross-sectional view of the conveyor (without the belt) taken at line 15-15 of FIG. 14.

Turning to FIG. 15, a cross-sectional view of the conveyor 214 taken along line 15-15 of FIG. 14, but with the belt 218 removed, is shown. The frame 222 includes belt return sliders 294 and a passage or channel 306 for a V-guide (shown in FIG. 8 as reference number 82) of a belt 218. The conveyor 214 may include one slider, two sliders, or more than two sliders. In the illustrated embodiment, the belt return sliders 294 are rollers. The conveying portion of the belt 218 slides along tracking guides 213 as it moves from the load end 230 to the discharge end 234 and returns to the load end 230 via the belt return sliders 294. The belt 218 is positioned on a top of the belt return sliders 294 and during use the belt 218 slides on top of the belt return sliders 294. The frame 222 may also have grooves 250 on the top or upper surface 211 to reduce the overall weight of the frame 222 and conveyor 214.

In the illustrated embodiment, the frame 222 is made from a channel and plate design, wherein an upper plate 203 and a lower plate 205 are bonded (with, for example, adhesive), to channel webs 207, 209. It will be appreciated that (as previously described), the upper plate 203, the lower plate 205, and the channel webs 207, 209 may be constructed from a single pultruded cross-section. Also shown in the illustrated embodiment, the belt return sliders 294 are fixed to L-brackets (which may be, for example, steel) and mounted to the lower plate 205 with bolted connections. In other embodiments, the return sliders 294 may be affixed to plates. It will be appreciated that the belt return sliders 294 can be fixed to the lower plate 205 with any type of connection (e.g., adhesive, rivets, welds, or the like). Further shown in the illustrated embodiment, the upper surface or a belt-carrying surface 211 of the upper plate 203 may include belt tracking guides 213, which can be formed by C brackets. The belt tracking guides 213 may be made from fiberglass or metal. In some embodiments, the belt tracking guides 213 are adhered or otherwise affixed to the upper plate 203 and are separated from one another to form channels or grooves 250. In other embodiments, the belt tracking guides 213 and the upper plate 203 may be formed from one piece. Also shown in the illustrated embodiment is at least one bearing 229 for slidably coupling the frame 222 to a carriage feature 215, discussed in detail below.

Figure 16:
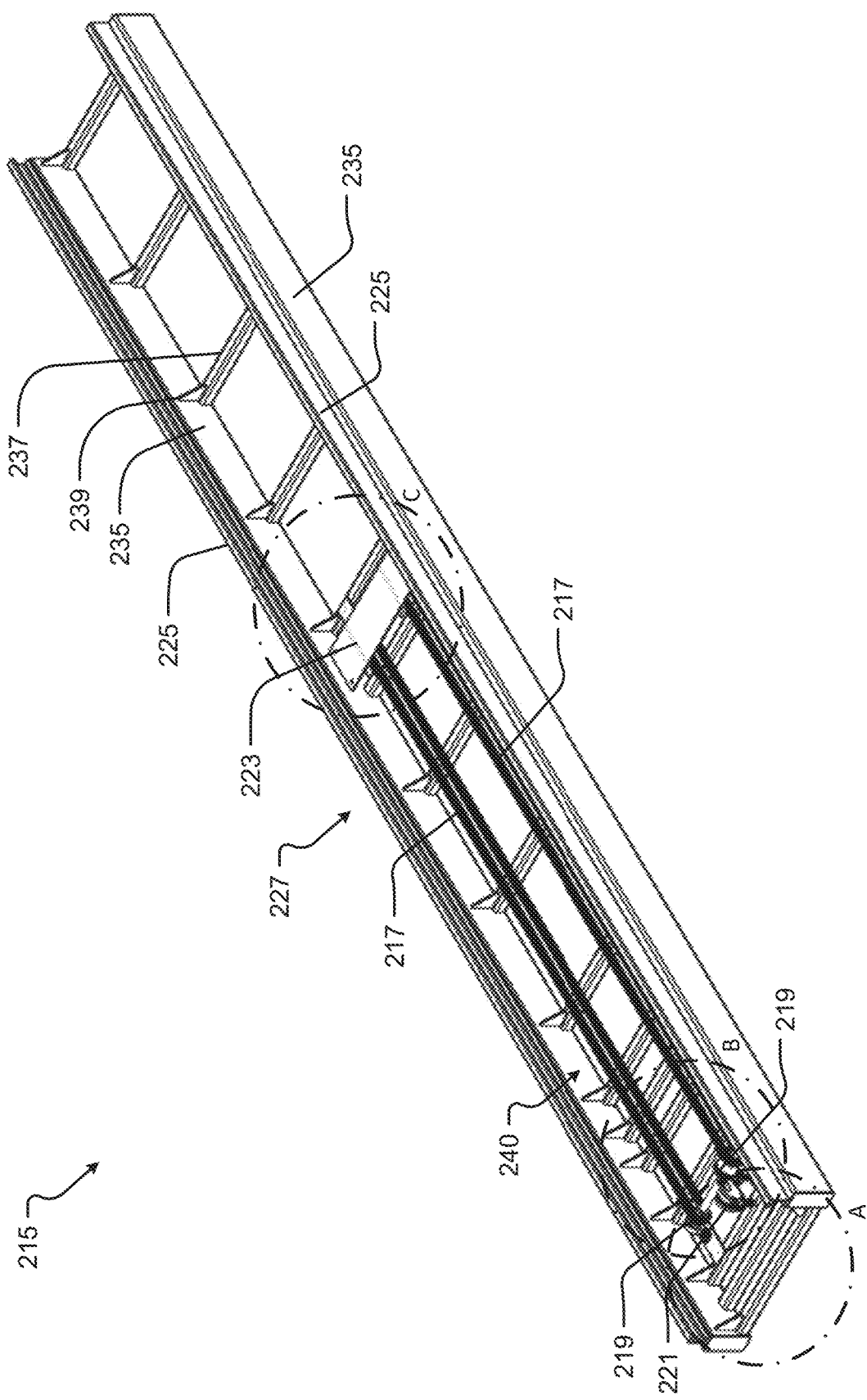
FIG. 16 is an isometric view of a carriage feature according to some embodiments of the present invention.

Turning to FIG. 16, a conveyor carriage feature 215 according to at least one embodiment is shown. The carriage feature 215 includes a carriage frame 227 supporting a linear rail system 240. The linear rail system 240 includes a pair of roller chains 217, a first pair of sprockets 219 and a second pair of sprockets 247 (not visible), a motor 221, a coupling bracket 223, and a pair of carriage channels 225. In some embodiments, the pair of chains 217 is between about 9.0 feet and about 11.0 feet, and preferably about 10.0 feet long. In other embodiments, the pair of chains 217 may be less than 9.0 feet or greater than 11.0 feet. It will be appreciated that the linear rail system 240 can include any number of chains, sprockets, motors, coupling brackets, or channels. It will also be appreciated that the linear rail system 240 can alternatively be driven by wire rope(s) and pulleys, hydraulic actuator(s), and/or linear screw drive(s).

The carriage frame 227 includes a pair of bars 235 (which may have a rectangular cross-section, as illustrated, or may have a cross-section of any shape) parallel to each other and coupled by a plurality of cross bars 237. The carriage frame 227 may also include cross reinforcements 239 at one or more cross bars 237. The pair of bars 235 and/or the plurality of cross bars 237 may be made from any material including steel, metal, fiberglass, or fiber reinforced plastic. The pair of bars 235 and the plurality of cross bars 237 may also be coupled to each other in any way including by welding, a bolted connection, adhesion, or the like. In some embodiments, all pieces of the carriage frame 227 may come from standard protrusion shapes.

Figure 17:
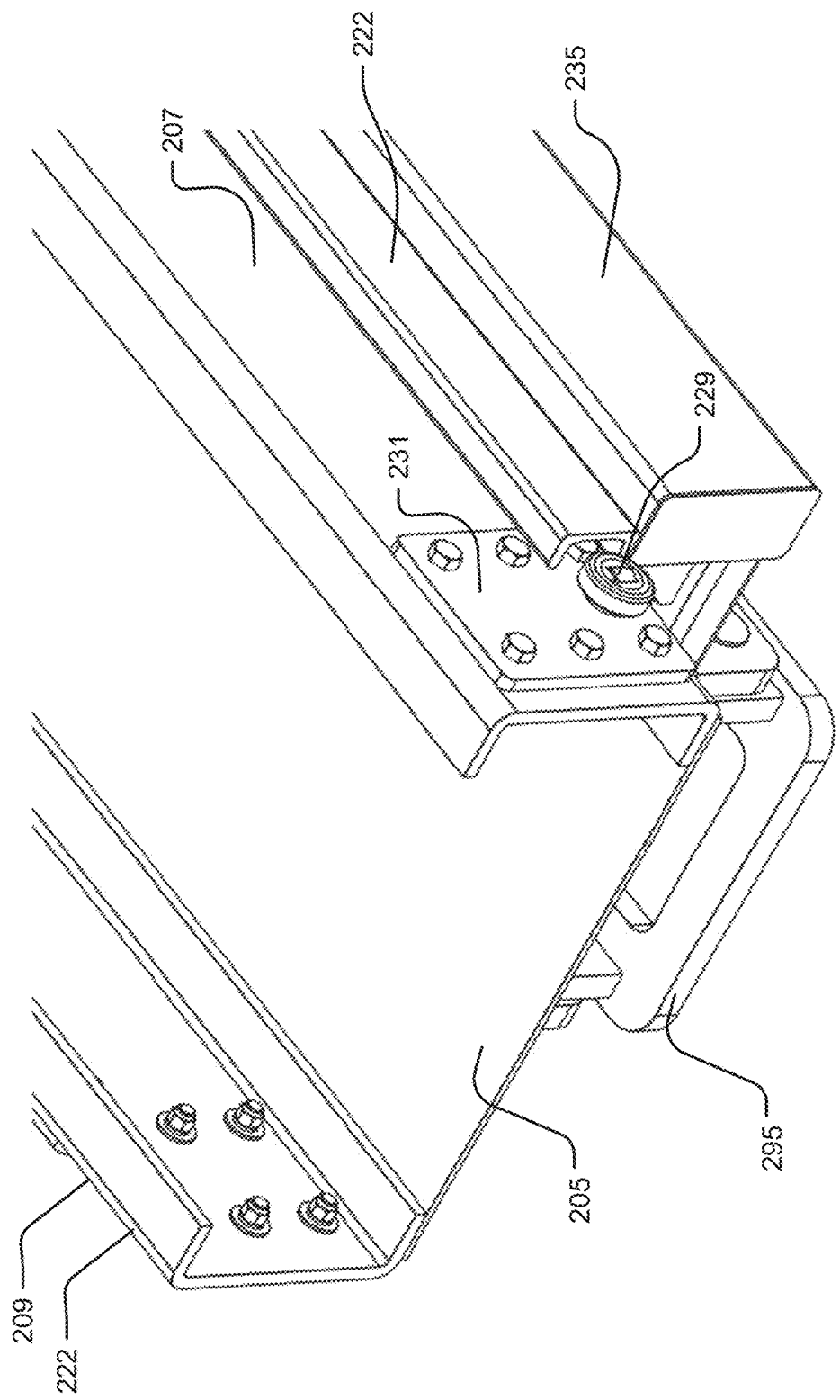
FIG. 17 is an enlarged view of detail A of FIG. 16.

Turning to FIG. 17, Detail A of FIG. 16 is shown with a portion of the conveyer frame 222 shown. Further, the conveyor frame 222 is shown translated away from the pair of carriage channels 225 to illustrate at least one bearing 229, described in more detail below.

As shown, the pair of carriage channels 225 are affixed to a corresponding bar 235. The pair of carriage channels 225 may be affixed via bolts, rivets, welds, adhesive, or the like. Each channel 225 is configured to receive at least one bearing 229 (also shown in FIG. 15) affixed to the conveyor frame 222 such that the conveyor frame 222 is in slidable communication with the carriage frame 227. More specifically, the conveyor frame 222 includes at least one bearing 229 affixed on each channel web 207, 209. The frame 222 may also include a reinforcement plate 231 for each bearing 229. The reinforcement plate 231 may be affixed to the corresponding channel web 207, 209 by bolts, as illustrated, though in other embodiments the reinforcement plate may be affixed to each channel web 207, 209 in any way including via adhesive, rivets, welds, or the like. During use, the bearings 229 may rotate or roll in the corresponding carriage channel 225 to slide the frame 222 (and thus, the conveyor 214) along the carriage feature 215 in the direction of arrow 233. In some embodiments, a maximum distance that the conveyor 214 may be extended is between about 8.0 feet and 11.0 feet. In some embodiments, a maximum distance that the conveyor 214 may be extended is between about 9.0 feet and 10.0 feet. In other embodiments, the maximum distance may be less than 8.0 feet or more than 11.0 feet.

Figure 22:
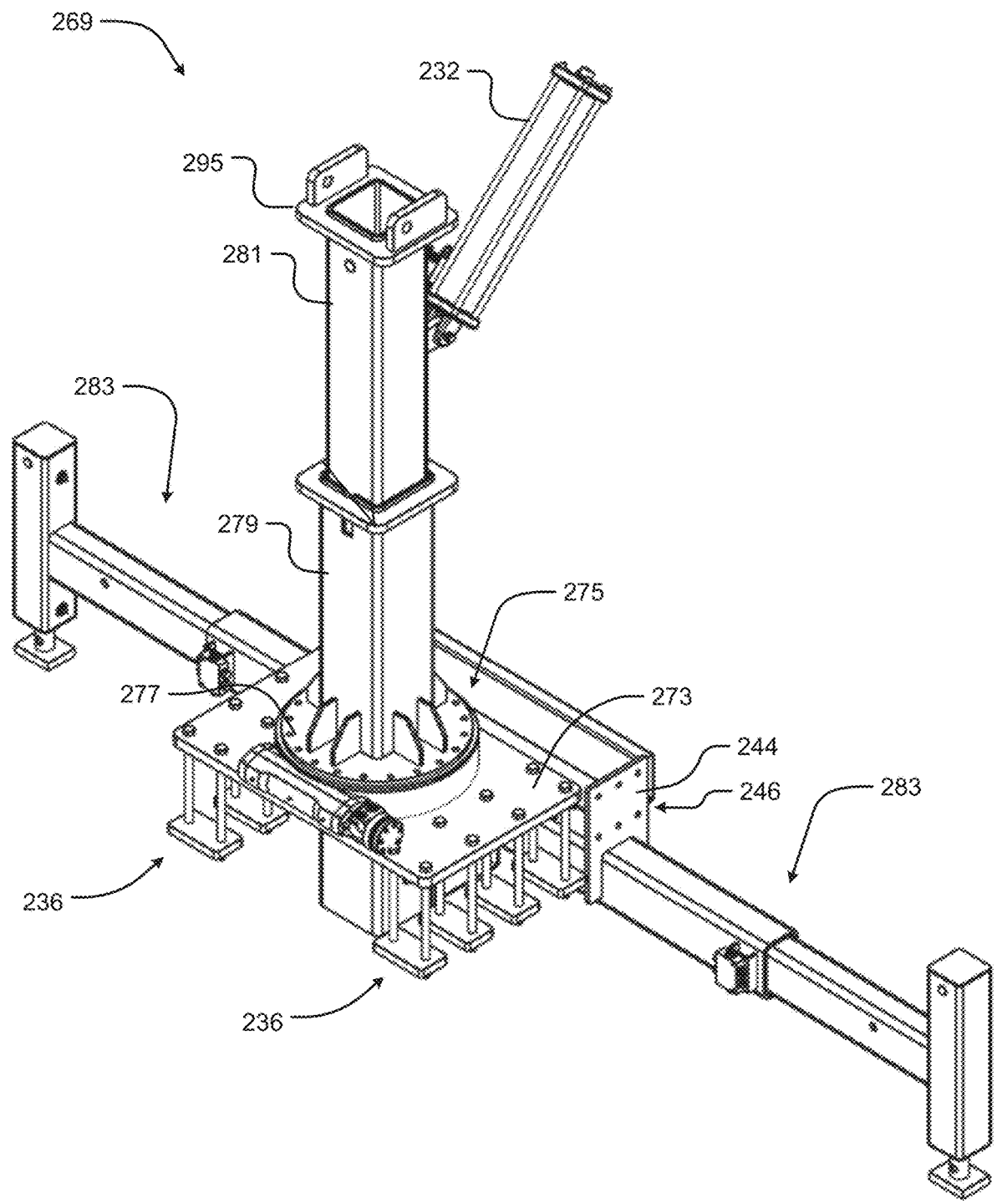
FIG. 22 is an isometric view of a turntable according to some embodiments of the present invention.

Also visible in FIG. 17 is a receiver 295 for receiving an inner post 281 of a turntable assembly 269 to couple the carriage feature 215 to the turntable assembly 269, discussed in detail with respect to FIG. 22.

Figure 18:
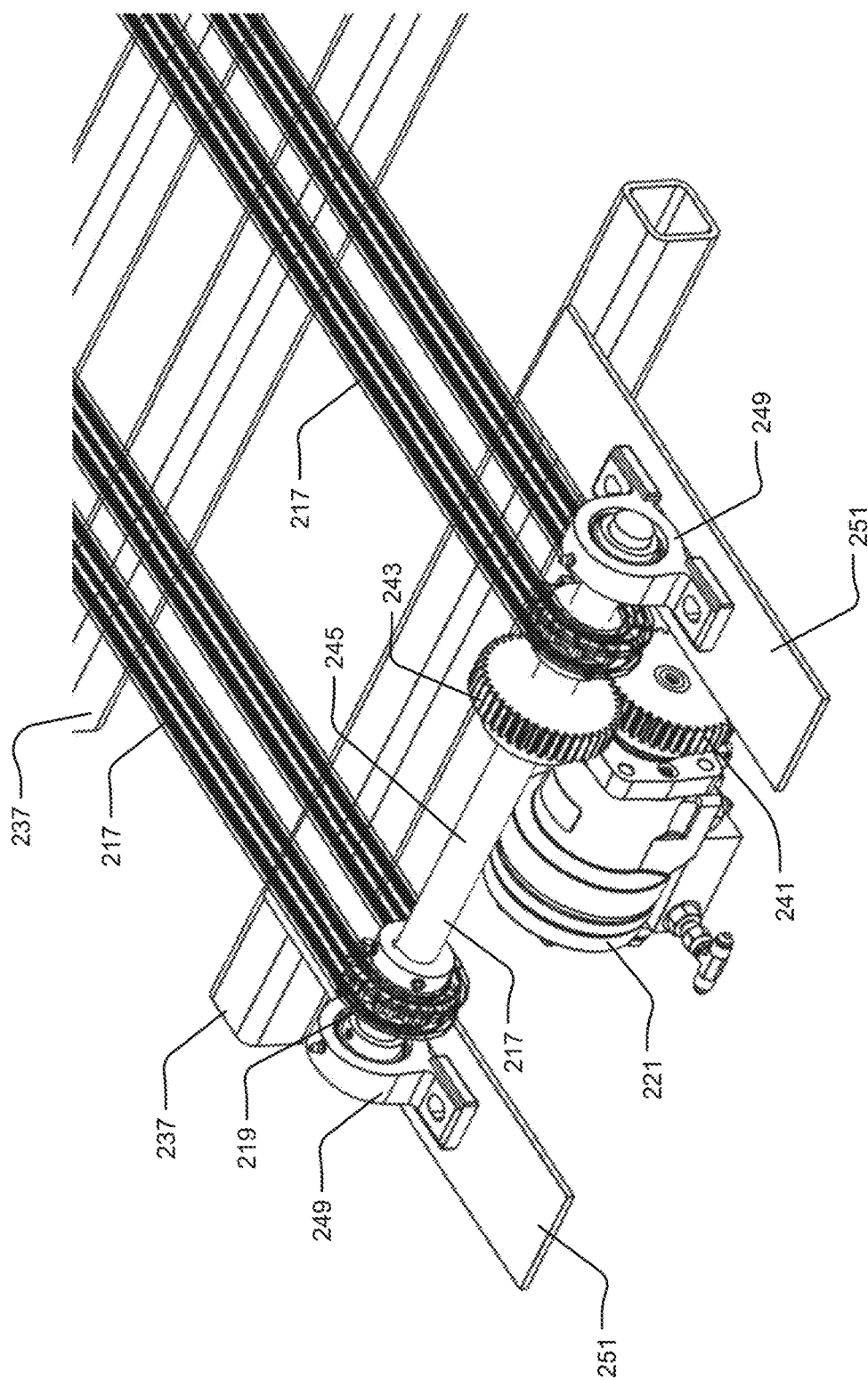
FIG. 18 is an enlarged view of detail B of FIG. 16.

Turning to FIG. 18, Detail B of FIG. 16 is shown without the pair of bars 235 and the carriage channels 225 for clarity. As shown, the motor 221 rotates a first gear 241, which rotates a second gear 243. The motor 221 may be an electric motor, a pneumatic motor, a hydraulic motor, or another type of motor. In some embodiments, the motor 221 comprises a gear motor. In other embodiments, the motor 221 comprises any type of motor including an AC brushless motor, a DC brushed motor, a DC brushless motor, a servo motor, or the like. The first gear 241 and/or the second gear 243 may be a spur gear. In other embodiments, the first gear 241 and/or the second gear 243 may be any type of gear. The second gear 243 is integrated with or coupled to a first rotatable bar 245 and thus when the second gear 243 rotates, the first bar 245 rotates. When the first bar 245 rotates, the pair of sprockets 219 affixed to the first bar 245 also rotate and the pair of sprockets 219 rotates the corresponding chain 217. The first bar 245 is supported by a first pair of bar supports 249 affixed to a corresponding pair of plates 251 spanning across two or more cross bars 237. The first pair of bar supports 249 are configured to receive and allow for the first bar 245 to rotate.

Figure 19:
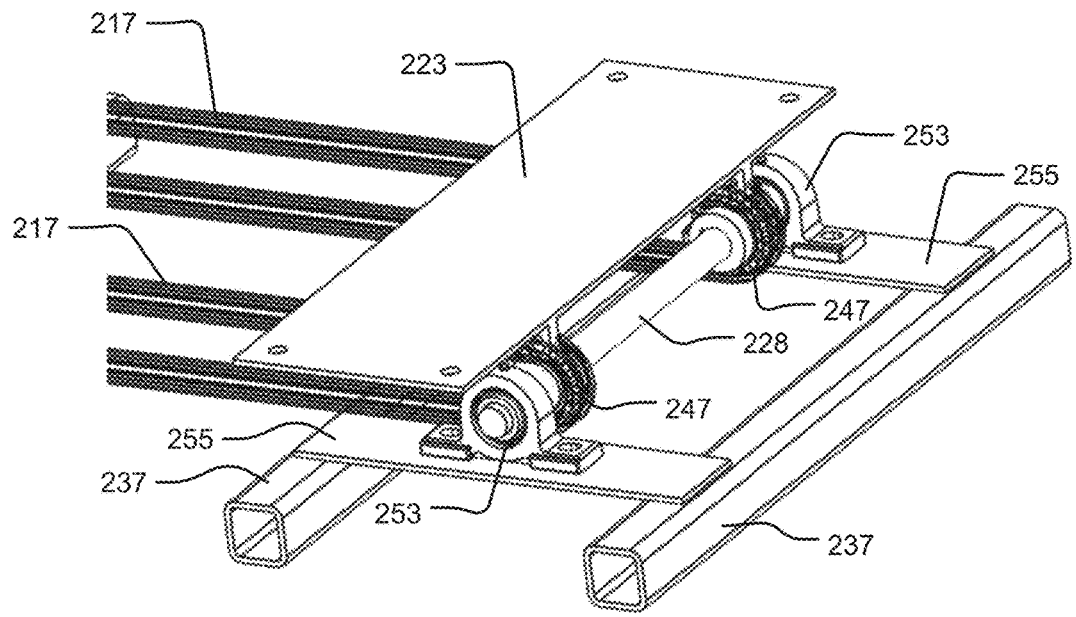
FIG. 19 is an enlarged view of detail C of FIG. 16.

Turning to FIG. 19, Detail C of FIG. 16 is shown without the pair of bars 235 and the carriage channels 225 for clarity. Detail C illustrates the opposite end of the pair of chains 217 shown in Detail B. As shown, the second pair of sprockets 247 are affixed to a second rotatable bar 247. When the pair of chains 217 rotate, the second pair of sprockets 247 rotates the second bar 228. The second bar 228 is supported by a second pair of bar supports 253 affixed to a corresponding pair of plates 255 spanning across two or more cross bars 237. The second pair of bar supports 253 are configured to receive and allow for the second bar 228 to rotate.

Figure 20:
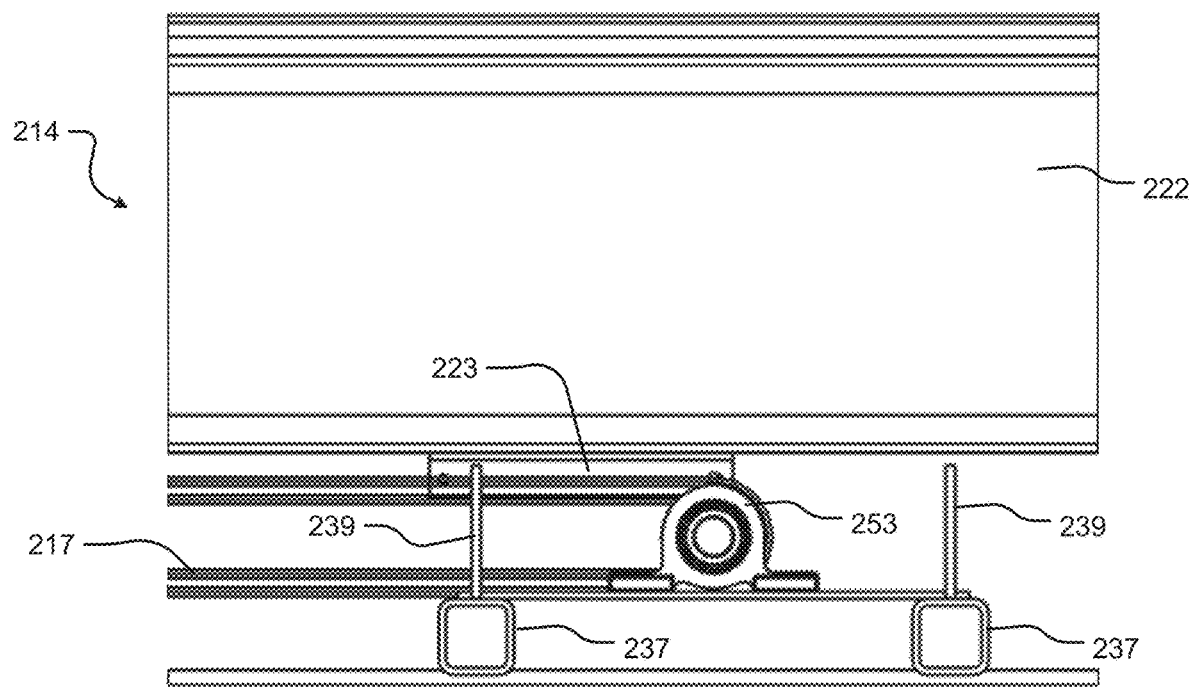
FIG. 20 is a side view of the carriage feature of FIG. 16.

With reference to FIG. 20, the coupling bracket 223 is affixed to the pair of chains 217 such that when the pair of chains 217 rotates, the coupling bracket 223 moves linearly. The coupling bracket 223 is also coupled to the conveyor frame 222. Thus, the conveyor 214 is coupled to the carriage feature 215 without the use of a carriage 50 as described in previous embodiments. During use, when the coupling bracket 223 moves linearly, the conveyor frame 222 also moves linearly (via the at least one bearings 229 rotating in the pair of carriage channels 225).

Figure 21A:
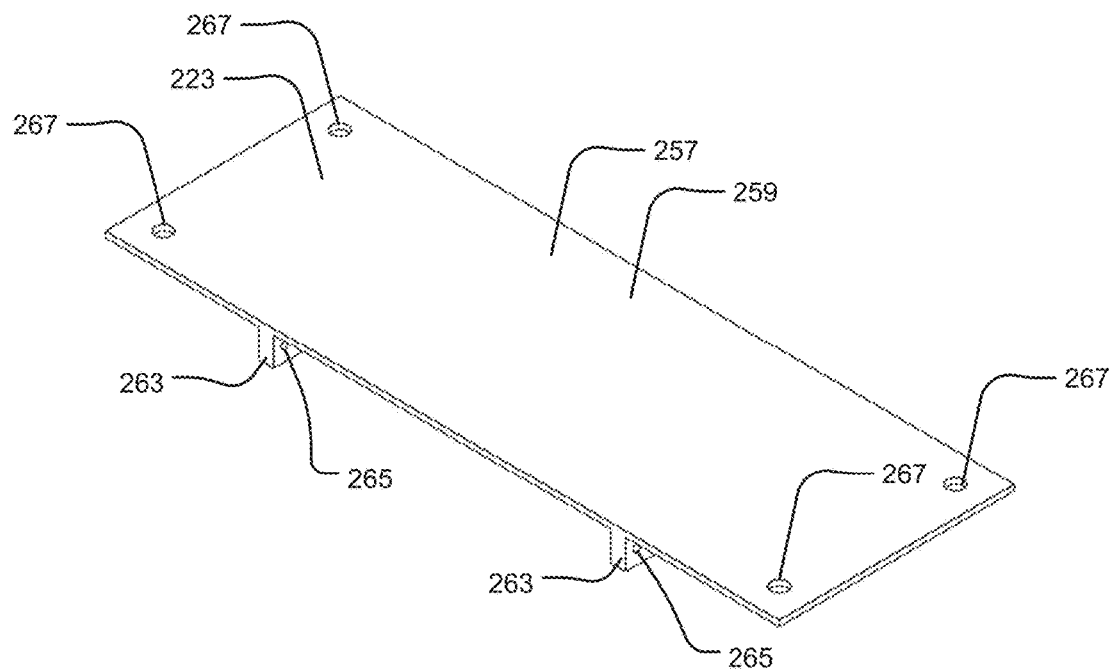
FIG. 21A is an isometric view of a coupling bracket of the carriage feature of FIG. 16.
Figure 21B:
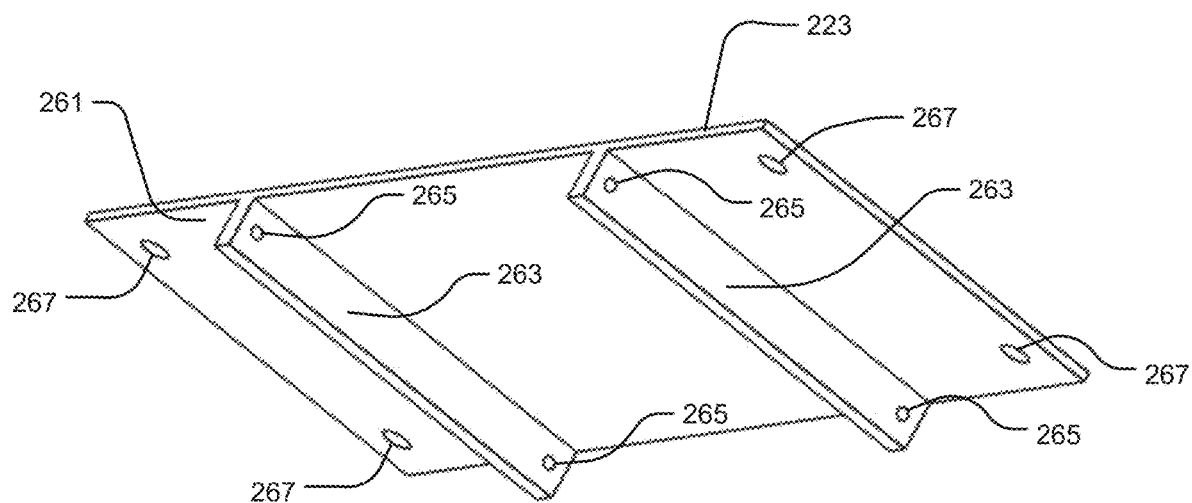
FIG. 21B is a bottom tilted view of the coupling bracket of the carriage feature of FIG. 16.

Turning to FIGS. 21A-21B, the coupling bracket 223 of the carriage feature 215 is shown in a top isometric view and a bottom tilted view, respectively. As described above, the coupling bracket 223 couples the conveyor 214 to the carriage feature 215. The coupling bracket 223 includes a plate 257 having an upper surface 259 and a lower surface 261. The conveyor frame 222 (and more specifically, the lower plate 205) is coupled to the coupling bracket 223 on the upper surface 259. In the illustrated embodiment, the plate 257 includes four apertures 267 for receiving bolts to affix the coupling bracket 223 to the frame 222. It will be appreciated that the plate 257 can include one aperture, two apertures, or more than two apertures. In other embodiments, the frame 222 may be affixed to the plate 257 in any way including rivets, welds, adhesive, or the like.

The couple bracket 223 also includes a pair of protrusions 263 extending from the lower surface 261. The pair of protrusions 263 are spaced apart a distance substantially equal to a distance between the pair of chains 217, though the pair of protrusions 263 may be spaced any distance in other embodiments. Each protrusion 263 include a pair of apertures 265 positioned at opposite ends. It will be appreciated that each protrusion 263 can include one aperture, two apertures, or more than two apertures. The pair of apertures 265 each receive a link of a corresponding chain 217 such that the coupling bracket 223 completes the circular chain 217. In other words, one end of a corresponding chain 217 is coupled to one aperture 265 and another end of the chain 217 is coupled to the other aperture 265. In other embodiments, the coupling bracket 223 may be affixed to the chain in any way.

Turning to FIG. 22, a turret or a turntable assembly 269 according to at least one embodiment is shown. In some embodiments, the turntable assembly 269 can be similar to the turntable assembly of U.S. Pat. No. 10,766,710, which is incorporated by reference herein, but is not identical. The turret or turntable assembly 269 includes a base plate 273 affixed to the plate 277, which is attached to the C-shaped frame rails of a vehicle (shown in FIGS. 23A-25B) via a bolted connection 236. A slew gear 275 is affixed to a top of the base 271 and is configured to prove azimuth motion to the conveyor 214. A plate 277 is affixed to a top of the slew gear 275 and the plate 277 is affixed to an outer post 279 of a pair of telescoping posts 279, 281. The turntable assembly 269 also includes an inner post 281 for mounting the carriage feature 215. The inner post 281 is nested inside of the outer post 279 to provide vertical (e.g., up and down) motion to the conveyer 214. The telescoping posts 279, 281 may provide a height adjustment of about 30.0 inches. In other embodiments, the telescoping posts 279, 281 may provide a height adjustment between about 20.0 inches to 40.0 inches and preferably between about 28.0 inches to 32.0 inches. It will be appreciated that the telescoping posts 279, 281 may also provide a height adjustment less than 20.0 inches or greater than 40.0 inches. The turntable assembly 269 further includes a hydraulic actuator 232 for providing altitude movement of the conveyor 214 and is affixed to the inner post 281 at one end and the carriage feature 215 at the other end.

In the illustrated embodiment, the plate 277 is mounted to the truck with a bolted connection 236, thereby mounting the turntable assembly 269 to the truck. The bolted connection 236 also ties a pair of frame rails 238 (shown in FIGS. 23A-25B) of a truck together. In other embodiments, the stabilizers 283 may be mounted to the truck by other connections such as welds, rivets, or the like. The frame rails 238 may extend a full length of a truck, though the frame rails 238 may extend for a portion of a length of the truck. To provide further support to the frame rails 238, multiple embodiments of frame rail supports 285 are discussed below.

Also shown are a pair of truck stabilizers 283, or outriggers, for providing support to the turntable assembly 269. The pair of truck stabilizers 283 is mounted to the truck with a pair of stabilizer plates 244 and a pair of corresponding bolted connections 246 (the left-side plate 244 and the left-side bolted connection 246 is not visible). As described below, FIGS. 23A-25B illustrate different ways to strengthen the frame rails 238 for the pair of truck stabilizers 283.

Figure 23A:
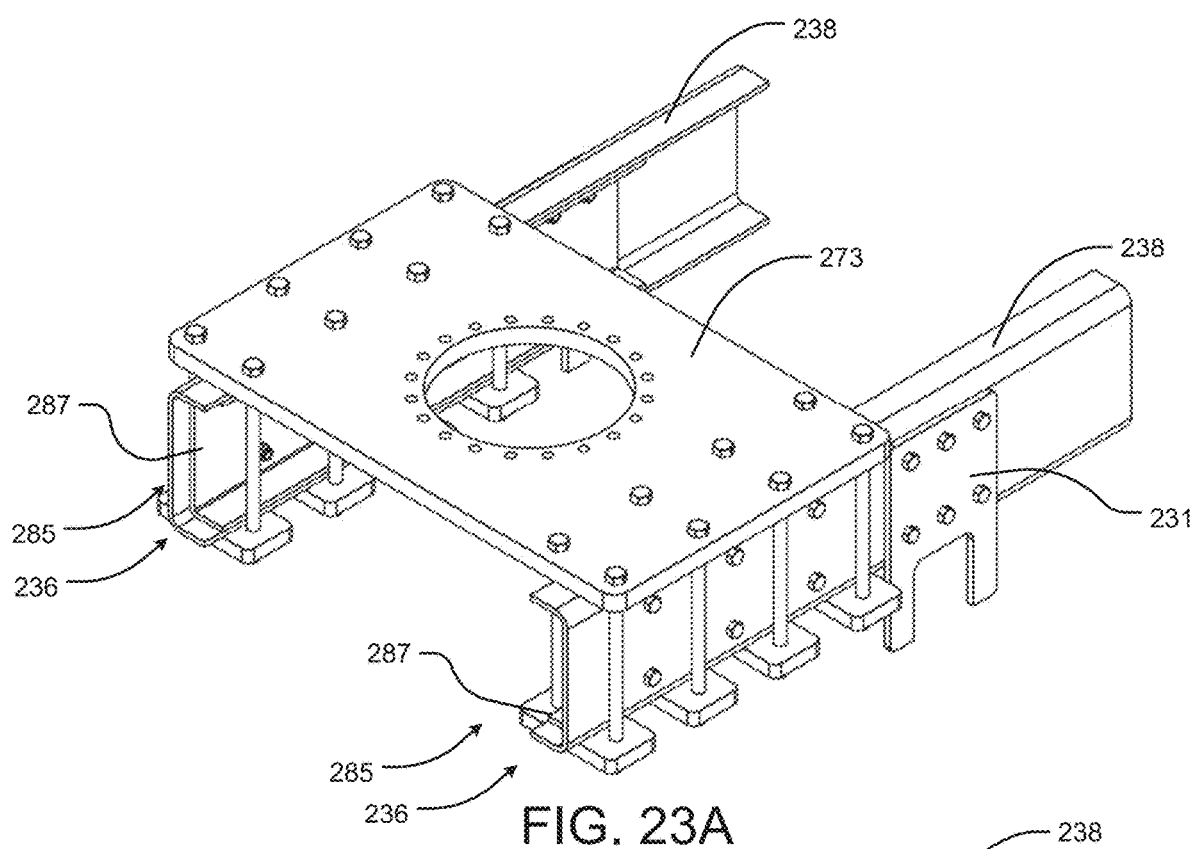
FIG. 23A is an isometric view of a turntable having a frame rail support according to some embodiments of the present invention.
Figure 23B:
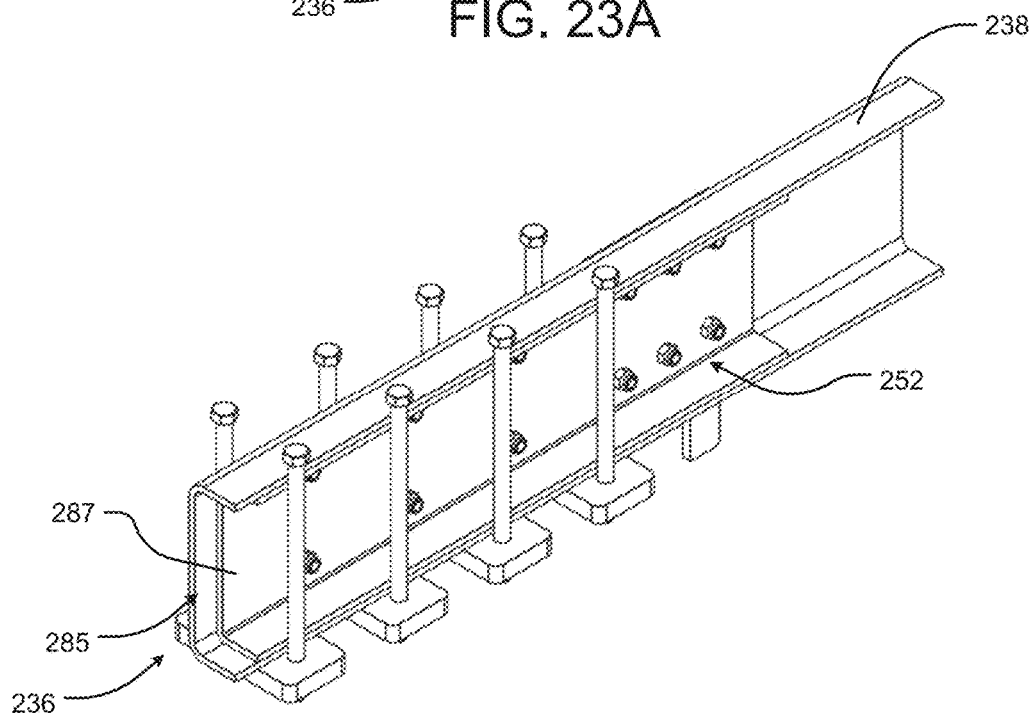
FIG. 23B is an isometric view of one half of the frame rail support of FIG. 23A.

Turning to FIGS. 23A-23B, a frame rail support 285 according to at least one embodiment is shown. The base plate 273 and one half of the frame rails 238 is not shown in FIG. 23B for clarity. The frame rail support 285 includes a C-shaped channel insert 287 inset into a corresponding frame rail 238. The C-shaped channel insert 287 approximately doubles a cross-sectional thickness of the frame rails 238, thus increasing a strength of the frame rails 238. The C-shaped channel insert 287 is bolted to the frame rail 238 in the illustrated embodiment via a plurality of bolts 252 arranged in pairs. In other embodiments, the insert 287 may be affixed to the frame rail 238 in any way including welds, rivets, adhesion, or the like.

Figure 24A:
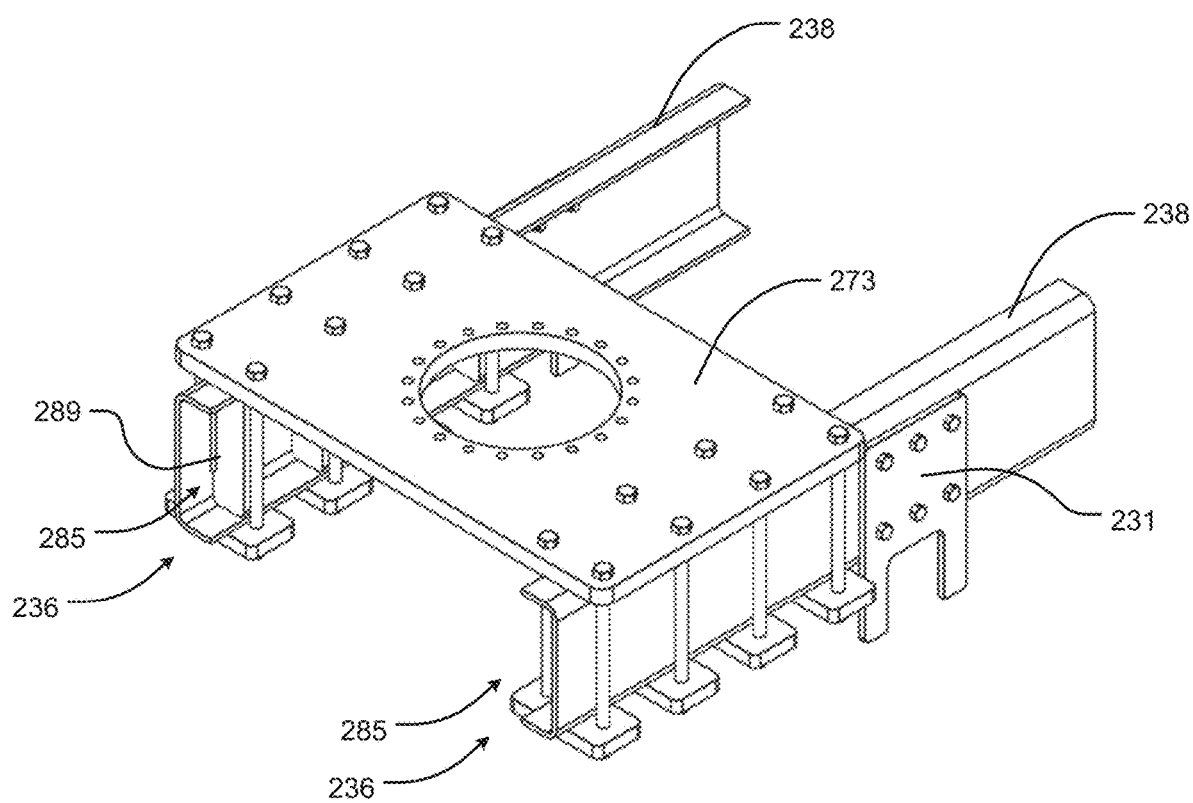
FIG. 24A is an isometric view of a turntable having a frame rail support according to some embodiments of the present invention.
Figure 24B:
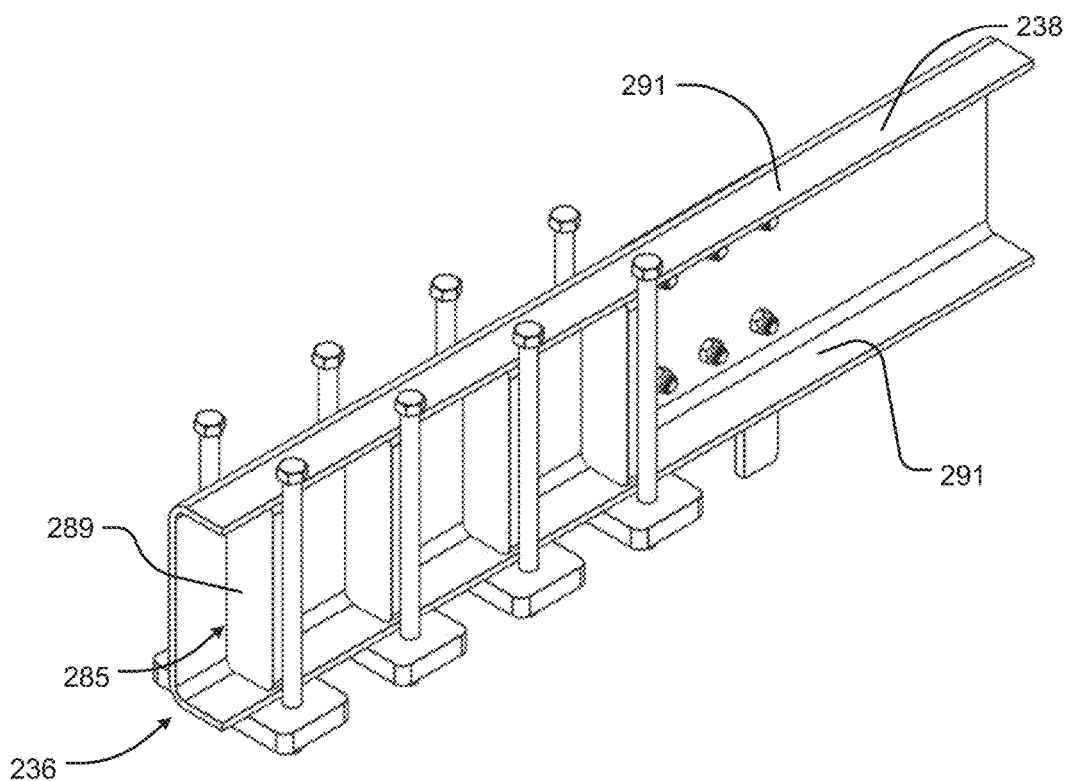
FIG. 24B is an isometric view of one half of the frame rail support of FIG. 24A.

Turning to FIGS. 24A-24B, another frame rail support 285 according to at least one embodiment is shown. The base plate 273 and one half of the frame rails 238 is not shown in FIG. 24B for clarity. The frame rail support 285 includes a plurality of plate inserts 289 inserted between two flanges 291 of a corresponding frame rail 238. In some embodiments, the plate inserts 289 are placed adjacent to the bolts of the base plate 273 and/or bolted connection 236 and welded to a web of the frame rails 238. In other embodiments, the plate inserts 289 may be affixed to the frame rail 238 in any way including welds, rivets, adhesion, or the like.

Figure 25A:
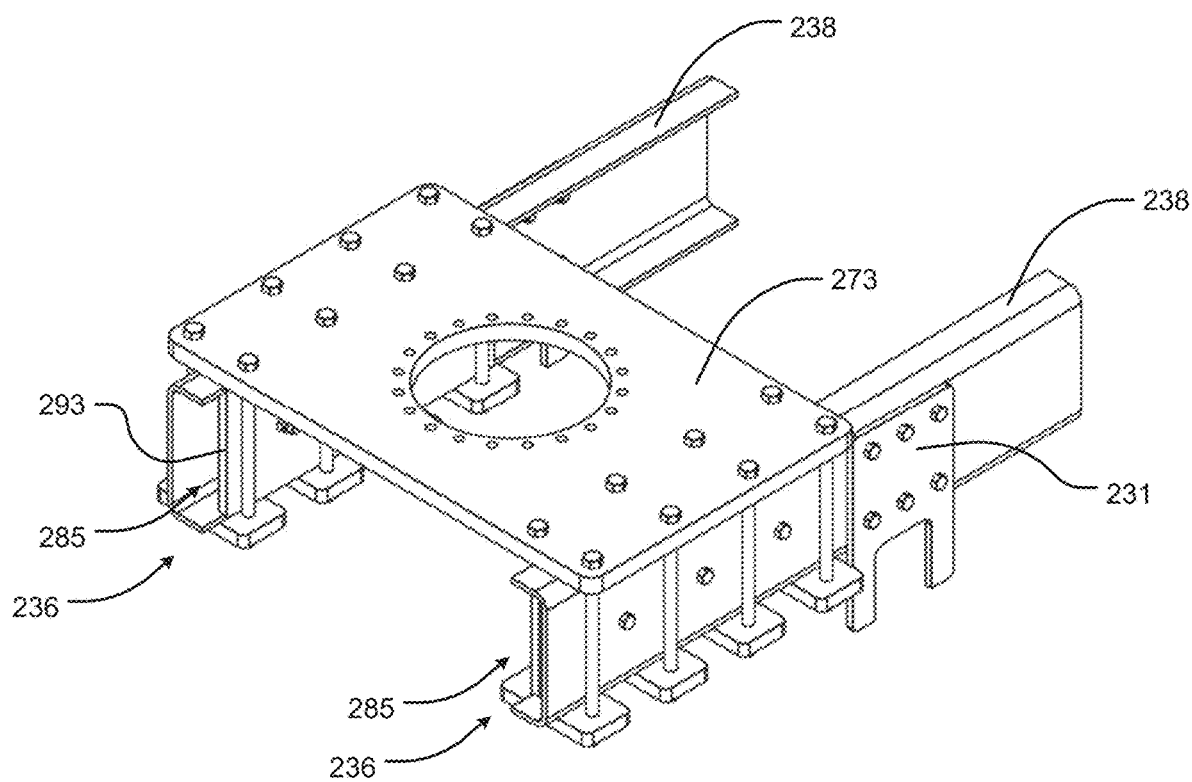
FIG. 25A is an isometric view of a turntable having a frame rail support according to some embodiments of the present invention.
Figure 25B:
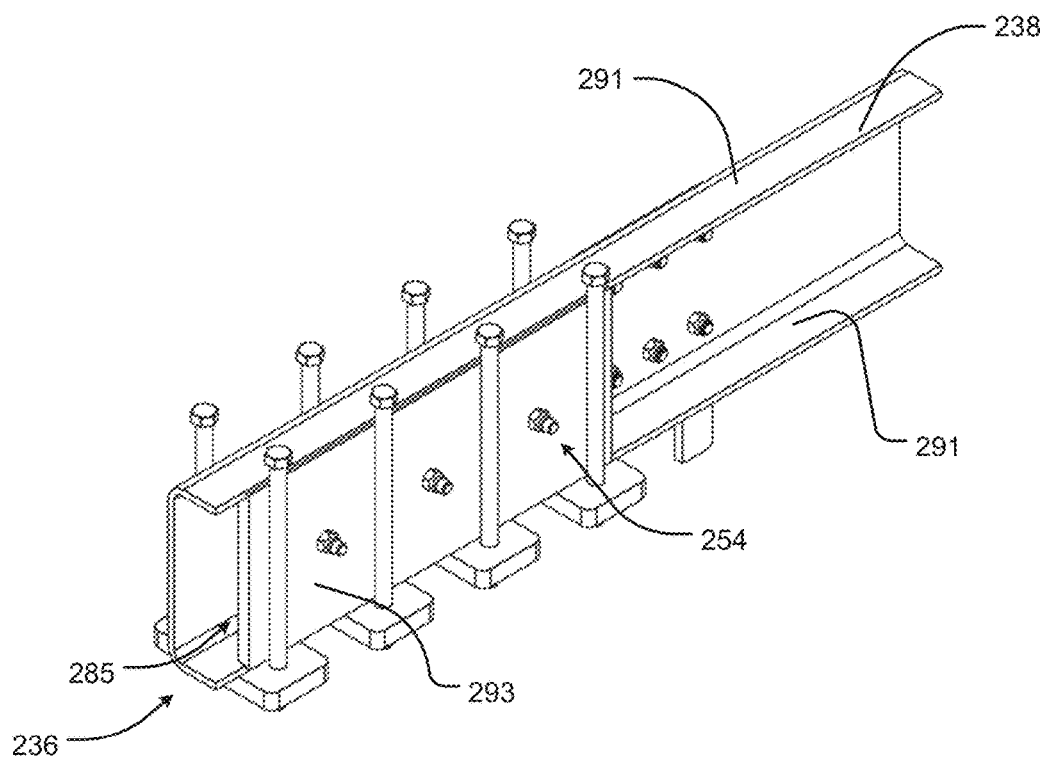
FIG. 25B is an isometric view of one half of the frame rail support of FIG. 25A.

Turning to FIGS. 25A-25B, another frame rail support 285 according to at least one embodiment is shown. The base plate 273 and one half of the frame rails 238 is not shown in FIG. 25B for clarity. The frame rail support 285 includes another embodiment of a plate insert 293. The plate insert 293 is positioned near an outer portion of the two flanges 291 of a corresponding frame rail 238. The plate insert 293 essentially turns the frame rail 238 from a C-shaped rail to a closed rectangular rail. The plate insert 293 is bolted to the corresponding frame rail 238 in the illustrated embodiment via a plurality of bolts 254. In other embodiments, the plate inserts 293 may be affixed to the frame rail 238 in any way including welds, rivets, adhesion, or the like.

With respect to any of the aforementioned embodiments described above, longer than 41 ft. conveyor and truck OAL combinations will be offered for higher discharge heights DH, longer discharge lengths DL, and shorter loading distance LD combinations. However, generally, these combinations will require CDL-rated GVWR trucks. Conveyor lengths up to 56 feet, and even up to 70 feet, are conceivable with the present invention, even though 54 feet is the longest truck-mounted conveyor for shingles currently available on the market and it is an expensive telescopic design.

Regardless of the GVWR truck rating, CDL or non-CDL, a shingle wholesaler desires to use, the carriage feature enables the combination of the shortest truck length possible with the longest conveyor length possible, to operate within traffic overhang laws. The use of the shortest truck length possible should always be encouraged because the shorter the truck, the shorter the bed length, which means less upfront cost, less fuel expense, and because of the carriage positioning benefit of drawing the conveyor closer to the pallets, the pallet advancing accessories of other manufacturers are harder to justify.

Any sized conveyor frame, belt, and cleats can be used with various embodiments of the present invention. In some of the embodiments shown, the belt is 18 in. wide and the cleats are 3¾ in. tall. The conveyor is 41 ft. (492 in.) long in some of the embodiments shown. However, other sizes are within the scope of this invention.

A number of variations and modifications of the invention can be used. It would be possible to provide for some features of the invention without providing others.

The present invention, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A conveyor system capable of being interconnected to a motor vehicle, comprising:
   a conveyor comprising:
      a conveyor frame having an upper plate and a lower plate coupled to a pair of channel flanges and one or more bearings disposed on each of the pair of channel flanges;
      a conveyor belt positioned on an upper surface of the conveyor frame;
      a plurality of belt return sliders; and
      a first motor to move the conveyor belt,
      wherein the conveyor can be positioned in a first road-travel position and a second position of use; and
   a conveyor carriage feature comprising:
      a carriage frame interconnected to a bottom portion of the conveyor frame, the carriage frame including a pair of bars parallel to and spaced from each other and a plurality of cross bars coupling the pair of bars; and
      a linear rail system interconnected to the carriage frame and the conveyor frame, the linear rail system including at least one chain, at least one sprocket, a second motor, a coupling bracket, and a pair of channels, the second motor configured to rotate the at least one sprocket, the at least one sprocket configured to rotate the at least one chain, the coupling bracket affixed to the chain and the conveyor frame, each of the pair of channels coupled to a corresponding bar of the pair of bars, the pair of channels configured to receive at least one of the one or more bearings,
      wherein the coupling bracket is configured to linearly move when the chain rotates, thereby causing the one or more bearings to slide in the pair of channels and linearly move the conveyor frame.

2. The conveyor system of claim 1, wherein when the conveyor is in the first road-travel position, the conveyor is substantially parallel to a longitudinal axis of the motor vehicle.

3. The conveyor system of claim 1, wherein the linear rail system also includes a first gear and a second gear, wherein the second motor is configured to rotate the first gear, the first gear is configured to rotate the second gear, and the second gear is configured to rotate the at least one sprocket.

4. The conveyor system of claim 3, wherein the at least one sprocket includes a first pair of sprockets and a second pair of sprockets, the first pair of sprockets disposed at a first end of the conveyor frame and the second pair of sprockets disposed at a second end of the conveyor frame, wherein the first pair of sprockets is rotated by the second gear.

5. The conveyor system of claim 1, wherein the coupling bracket includes a plate having an upper surface and a lower surface and a pair of protrusions extending from the lower surface, the conveyor frame coupled to the coupling bracket on the upper surface.

6. The conveyor system of claim 5, wherein the at least one chain includes a pair of chains, and wherein each of the pair of protrusions includes a pair of apertures positioned at opposite ends, each aperture receiving a link of a corresponding chain.

7. The conveyor system of claim 1, further comprising:
   a turntable assembly affixed to a pair of frame rails, the turntable assembly coupled to the conveyor and configured to provide azimuth movement to the conveyor; and
   at least one frame rail support affixed to the pair of frame rails.

8. The conveyor system of claim 7, wherein the at least one frame rail support is a C-shaped channel insert inset into a corresponding frame rail.

9. The conveyor system of claim 8, wherein the at least one frame rail is a plurality of plate inserts inserted between two flanges of a corresponding frame rail.

10. The conveyor system of claim 8, wherein the at least one frame rail is a plate insert positioned near an outer position of two flanges of a corresponding frame rail.

11. A conveyor capable of being interconnected to a motor vehicle, comprising:
    a load end;
    a top end opposite the load end;
    a tube frame having a top side interconnected to a first side and a second side, a bottom side interconnected to the first side and the second side, a longitudinal length, and a plurality of bearings coupled to each of the first side and the second side;
    a carriage frame interconnected to the bottom side, the carriage frame including a pair of bars parallel to and spaced from each other and a plurality of cross bars coupling the pair of bars;
    a linear rail system interconnected to the carriage frame and the tube frame, the linear rail system including a pair of chains, a first gear, a second gear, a first pair of sprockets, a second pair of sprockets, a first motor, a coupling bracket, and a pair of channels, the first motor configured to rotate the first gear, the first gear configured to rotate the second gear, the second gear configured to rotate the first pair of sprockets, the first pair of sprockets configured to rotate the pair of chains, and the pair of chains configured to linearly move the coupling bracket, the coupling bracket affixed to the chain and the tube frame, each of the pair of channels coupled to a corresponding bar of the pair of bars, the pair of channels configured to receive the plurality of bearings, wherein the coupling bracket is configured to linearly move when the pair of chains rotates, thereby causing the plurality of bearings to slide in the pair of channels and linearly move the tube frame;
    a conveyor belt positioned on an upper surface of the top side of the tube frame and extending from the load end of the conveyor to the top end of the conveyor;
    a plurality of cleats interconnected to the conveyor belt and positioned on an outward facing surface of the conveyor belt, wherein the plurality of cleats comprises one or more groups of cleats, and wherein each group of cleats comprises at least two cleats;

a backstop positioned at the load end of the conveyor;

a plurality of belt return sliders; and a second motor to move the conveyor belt and positioned between the first side and the second side of the tube frame.

12. The conveyor of claim 11, wherein the coupling bracket includes a plate having an upper surface and a lower surface and a pair of protrusions extending from the lower surface, the conveyor frame coupled to the coupling bracket on the upper surface.

13. The conveyor of claim 12, wherein each of the pair of protrusions includes a pair of apertures positioned at opposite ends, each aperture receiving a link of a corresponding chain.

14. The conveyor of claim 11, wherein the first gear and the second gear are each a spur gear.

15. The conveyor of claim 11, further comprising a turntable assembly affixed to frame rails and at least one frame rail support, the turntable assembly coupled to the conveyor and configured to provide azimuth movement to the conveyor.

16. A conveyor system comprising:

a conveyor comprising:

a conveyor frame having an upper plate and a lower plate coupled to a pair of channel flanges and a pair of bearings disposed on each of the pair of channel flanges;

a conveyor belt supported by the conveyor frame; and a first motor to move the conveyor belt;

a conveyor carriage feature comprising:

a carriage frame interconnected to a bottom portion of the conveyor frame, the carriage frame including a pair of bars parallel to and spaced from each other and a plurality of cross bars coupling the pair of bars; and a linear rail system interconnected to the carriage frame and the conveyor frame, the linear rail system including at least one chain, at least one sprocket, a second motor, a coupling bracket, and a pair of channels, the second motor configured to rotate the at least one sprocket, the at least one sprocket configured to rotate the at least one chain, the coupling bracket affixed to the chain and the conveyor frame, each of the pair of channels coupled to a corresponding bar of the pair of bars, the pair of channels configured to receive at least one of the pair of bearings;

wherein the coupling bracket is configured to linearly move as the chain rotates, thereby causing the pair of bearings to slide along the pair of channels and linearly move the conveyor frame;

a turntable assembly affixed to a pair of frame rails, the turntable assembly coupled to the conveyor and configured to provide azimuth movement to the conveyor; and at least one frame rail support coupled to the pair of frame rails.

17. The conveyor system of claim 16, wherein the at least one frame rail support is a C-shaped channel insert inset into a corresponding frame rail.

18. The conveyor system of claim 16, wherein the at least one frame rail is a plurality of plate inserts inserted between two flanges of a corresponding frame rail.

19. The conveyor system of claim 16, wherein the at least one frame rail is a plate insert positioned near an outer position of two flanges of a corresponding frame rail.

20. The conveyor system of claim 16, wherein the linear rail system also includes a first gear and a second gear, wherein the second motor is configured to rotate the first gear, the first gear is configured to rotate the second gear, and the second gear is configured to rotate the at least one sprocket.

* * * * *